(12) United States Patent
Cho

(10) Patent No.: US 10,170,099 B2
(45) Date of Patent: Jan. 1, 2019

(54) ELECTRONIC DEVICE AND METHOD FOR REPRESENTING WEB CONTENT FOR THE ELECTRONIC DEVICE

(71) Applicant: SAMSUNG ELECTRONICS CO., LTD., Suwon-si, Gyeonggi-do (KR)

(72) Inventor: Kyung-Sun Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/983,683

(22) Filed: Dec. 30, 2015

(65) Prior Publication Data

US 2016/0203814 A1    Jul. 14, 2016

(30) Foreign Application Priority Data

Jan. 8, 2015    (KR) .................. 10-2015-0002646

(51) Int. Cl.
*G10L 15/16*    (2006.01)
*G10L 25/48*    (2013.01)
(Continued)

(52) U.S. Cl.
CPC .............. *G10L 13/04* (2013.01); *G06F 3/14* (2013.01); *G06F 17/2235* (2013.01); *G06F 17/2247* (2013.01); *H04L 67/02* (2013.01); *H04W 4/70* (2018.02); *G06F 3/1454* (2013.01); *G09G 2320/0613* (2013.01); *G09G 2340/14* (2013.01); *G09G 2340/145* (2013.01); *G09G 2358/00* (2013.01); *G09G 2360/144* (2013.01); *H04W 4/80* (2018.02)

(58) Field of Classification Search
CPC combination set(s) only.
See application file for complete search history.

(56) References Cited

U.S. PATENT DOCUMENTS

| 6,282,511 B1 | 8/2001 | Mayer |
| 2006/0110008 A1* | 5/2006 | Vertegaal ........... G06K 9/00604 382/103 |

(Continued)

FOREIGN PATENT DOCUMENTS

| JP | 3714159 | 9/2005 |
| KR | 1999-0031015 | 5/1999 |

(Continued)

OTHER PUBLICATIONS

Search Report and Written Opinion dated Apr. 19, 2016 in counterpart International Patent Application No. PCT/KR2016/000203.

*Primary Examiner* — Shreyans A Patel
(74) *Attorney, Agent, or Firm* — Nixon & Vanderhye P.C.

(57) ABSTRACT

An electronic device is disclosed, the electronic device including a display configured to display a first web page including a first area and a second area, a sensor configured to sense a context of the electronic device, communication circuitry configured to communicate with an external device, and a controller configured to convert at least one of the first area and the second area into voice data based on a signal output from the sensor and to control the communication circuitry to transmit the first area to the external device based on context information regarding the external device received through the communication circuitry.

14 Claims, 8 Drawing Sheets

(51) Int. Cl.
  *G10L 13/04*   (2013.01)
  *G06F 17/22*   (2006.01)
  *H04L 29/08*   (2006.01)
  *G06F 3/14*    (2006.01)
  *H04W 4/70*    (2018.01)
  *H04W 4/80*    (2018.01)

(56) References Cited

U.S. PATENT DOCUMENTS

| | | | |
|---|---|---|---|
| 2011/0119572 | A1 | 5/2011 | Jang et al. |
| 2011/0289394 | A1* | 11/2011 | Roh ................ G06F 17/30873 715/205 |
| 2012/0242473 | A1* | 9/2012 | Choi .................... B60W 50/14 340/441 |
| 2014/0028921 | A1 | 1/2014 | Moon et al. |
| 2014/0241540 | A1 | 8/2014 | Hodges et al. |
| 2015/0281009 | A1* | 10/2015 | Melcher ................ G06T 11/206 709/224 |
| 2015/0316391 | A1* | 11/2015 | Zhou .................. G01C 21/3688 701/526 |

FOREIGN PATENT DOCUMENTS

| | | |
|---|---|---|
| KR | 10-0284582 | 12/2000 |
| KR | 10-1217521 | 1/2013 |

* cited by examiner

ELECTRONIC DEVICE AND METHOD FOR REPRESENTING WEB CONTENT FOR THE ELECTRONIC DEVICE

CROSS-REFERENCE TO RELATED APPLICATION

This application is based on and claims priority under 35 U.S.C. § 119 to a Korean patent application filed in the Korean Intellectual Property Office on Jan. 8, 2015 and assigned Serial No. 10-2015-0002646, the disclosure of which is incorporated by reference herein in its entirety.

TECHNICAL FIELD

Various examples of the disclosure relate to an electronic device and a method for representing a web content for the electronic device, and for example, to an electronic device and a method for representing a web content for the electronic device, in which a web page displayed on a display is converted into voice for output and a link object included in the web page may be output to an external device.

BACKGROUND

A web, hereinafter generally referred to as a web page, web content, or the like, mainly visually describes and presents information such as texts, still images, video, or the like. The web may present various objects on a screen by combining a hypertext markup language (HTML), a cascading style sheet (CSS), java script (JS), and so forth. Along with advances in the web, terminals capable of representing the web have been diversified to tablet personal computers (PCs), smartphones, smart televisions (TVs), smart watches, and the like from existing desktop PCs and laptop computers. In particular, as can be seen from wearable devices like wearable devices and Internet of things (IoT)/web of things (WoT), sizes of terminals and sizes of screens of the terminals have also been reduced and shapes of the terminals have been diversified when compared to existing terminals. Due to changes in a web surrounding environment, a technique is needed to convert a web page with various modality information, instead of existing visual modality, and to provide the web page to a user. Also, various methods are needed to actively identify user's intention and context and provide a web page seamlessly, unlike existing manual web browsing The above information is presented as background information only to assist with an understanding of the disclosure.

SUMMARY

Various aspects of the disclosure provide an electronic device and a method for representing a web content for the electronic device, in which a web page displayed on the electronic device is converted into voice or audio data for output and at least one link object included in the web page is delivered to an external device, such as a wearable device, and displayed on a display of the external device.

According to various examples of the disclosure, an electronic device is provided including a display configured to display a first web page, a sensor configured to sense a context of the electronic device, communication circuitry configured to communicate with an external device, and a controller configured to convert at least a portion of the first web page into audio data which may, for example, be represented as a voice or voice data based on a signal output from the sensor and to control the communication circuitry to transmit the at least a portion of the first web page to the external device based on context information regarding the external device received through the communication circuitry.

The controller may be configured to receive an input for selecting a link object displayed on the external device through the communication circuitry and to control the display to display a second web page corresponding to the selected link object based on the input on the display unit. The controller may be configured to convert the first web page into information that is processible by the external device based on the context information regarding the external device.

The electronic device may further include a location information receiver configured to receive location information regarding the electronic device, in which the at least a portion of the first web page is converted into a voice based on a signal output from the location information receiver. The controller may be configured to transmit the at least a portion of the first web page to the external device through the communication circuitry based on security information included in the first web page.

The electronic device may further include audio output circuitry, wherein the controller is configured to output the voice through the audio output circuitry. The sensor may include at least one of an optical sensor, an acceleration sensor, and a gravity sensor.

The first web page may include link objects, and the controller may be configured to transmit at least some of the link objects to the external device based on priorities of the link objects.

According to various examples of the disclosure, a method for representing web content for an electronic device is provided, the method including displaying a first web page on a display of the electronic device, sensing a context of the electronic device through a sensor, receiving context information regarding an external device, and converting at least a portion of the first web page into an audio signal which may, for example, be represented as voice data based on a signal output from the sensor and transmitting the at least a portion of the first web page to the external device based on received context information regarding the external device.

The method may further include receiving an input for selecting a link object displayed on the external device through communication circuitry of the electronic device and displaying a second web page corresponding to the selected link object based on the input on the display.

The method may further include converting the first web page into information that is processible by the external device based on the context information regarding the external device.

The method may further include receiving location information regarding the electronic device and converting the at least a portion of the first web page into voice data based on the received location information.

The method may further include transmitting the at least a portion of the first web page to the external device through the communication circuitry based on security information included in the first web page.

The method may further include outputting the voice data through audio output circuitry of the electronic device. The sensor may include at least one of an optical sensor, an acceleration sensor, and a gravity sensor. The first web page may include link objects, and the method may include transmitting at least some of the link objects to the external device based on priorities of the link objects.

According to various examples of the disclosure, an electronic device is provided including a display configured to display a first web page, a sensor configured to sense a context of the electronic device, communication circuitry configured to communicate with an external device, and a controller configured to convert the at least a portion of the first web page into first modality information based on a signal output from the sensor. The electronic device may receive context information regarding the external device through the communication circuitry, and the controller may be configured to transmit the at least a portion of the first web page to the external device based on the received context information regarding the external device. The controller may be configured to output at least some of link objects included in the first web page to the external device through the communication circuitry.

The controller may be configured to receive an input for selecting a link object displayed on the external device through the communication circuitry and to control the display to display a second web page corresponding to the selected link object based on the received signal on the display.

The electronic device may receive context information regarding the external device through the communication circuitry, and the controller may be configured to convert the first web page into information that is processible by the external device based on the context information regarding the external device.

The electronic device may further include a location information receiver configured to receive location information regarding the electronic device and the controller may be configured to convert the at least a portion of the first web page into first modality information based on a signal output from the location information receiver. The first modality may include, for example, a voice modality. The first modality may include, for example, a tactile modality.

The electronic device may further include audio output circuitry, and the controller may be configured to output the first web page converted into the first modality information through the audio output circuitry.

The controller may be configured to output the at least a portion of the first web page to the external device through the communication circuitry based on security information included in the first web page.

According to various examples of the disclosure, a method for representing web content for an electronic device is provided, the method including displaying a first web page on a display of the electronic device, sensing a context of the electronic device through a sensor, and converting at least a portion of the first web page into first modality based on a signal output from the sensor.

The method may further include receiving context information regarding an external device and transmitting the at least a portion of the first web page to the external device based on the received context information regarding the external device.

The method may further include outputting at least on link object included in the first web page to the external device through the communication circuitry.

The method may further include receiving a signal based on an input for selecting one of link objects displayed on the external device through the communication circuitry and displaying a second web page corresponding to the selected link object based on the received input on the display.

The method may further include receiving context information regarding the external device through the communication circuitry and converting the first web page into information that is processible by the external device based on the context information regarding the external device.

The method may further include receiving location information regarding the electronic device and converting the at least a portion of the first web page into first modality information based on a signal output from the location information receiver. The first modality may include, for example, a voice modality. The first modality may include, for example, a tactile modality.

The method may further include outputting the first web page converted into the first modality information through the audio output circuitry.

The method may further include outputting the at least a portion of the first web page to the external device through the communication circuitry based on security information included in the first web page.

According to various examples of the disclosure, an electronic device is provided including a display configured to display a first web page including a first area and a second area, a sensor configured to sense a context of the electronic device, communication circuitry configured to communicate with an external device, and a controller configured to convert at least one of the first area and the second area into an audio signal which may, for example, represent a voice or voice data based on a signal output from the sensor and to control the communication circuitry to transmit the first area to the external device based on context information regarding the external device received through the communication circuitry.

The controller may be configured to convert the first area into information that is processible by the external device based on the context information regarding the external device.

The electronic device may further include a location information receiver configured to receive location information regarding the electronic device, in which the first area is converted into voice data based on a signal output from the location information receiver.

The controller may be configured to transmit the first area to the external device through the communication circuitry based on security information included in the first web page.

According to various examples of the disclosure, an electronic device is provided including a display configured to display a first web page including a first area and a second area, a sensor configured to sense a context of the electronic device, communication circuitry configured to communicate with an external device, and a controller configured to convert at least one of the first area and the second area into an audio signal which may, for example, represent a voice or voice data based on a signal output from the sensor.

The electronic device may receive context information regarding the external device through the communication circuitry, and the controller may be configured to transmit the first area to the external device based on the received context information regarding the external device.

According to various examples of the disclosure a method for representing web content for an electronic device is provided, the method including displaying a first web page including a first area and a second area on a display of the electronic device, sensing a context of the electronic device, receiving context information regarding an external device, transmitting the first area to the external device based on the received context information regarding the external device, and converting at least one of the first area and the second area into voice data based on the context of the electronic device.

The method may further include receiving a signal based on an input for selecting a link object displayed on the external device through communication circuitry of the electronic device and displaying a second web page corresponding to the selected link object based on the signal on the display.

The method may further include converting the first area into information that is processible by the external device based on the context information regarding the external device.

The method may further include receiving location information regarding the electronic device and converting the first area into voice data based on the received location information.

The method may further include transmitting the first area to the external device through the communication circuitry based on security information included in the first web page.

According to various examples of the disclosure, a method for representing web content for an electronic device is provided, the method including displaying a first web page including a first area and a second area on a display of the electronic device, sensing a context of the electronic device, and converting at least one of the first area and the second area into voice data based on the context of the electronic device.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

These and other aspects, features and advantages of the disclosure will become more apparent from the following detailed description, taken in conjunction with the drawings, in which like reference numerals refer to like elements, and wherein.

DETAILED DESCRIPTION

Figure 1A:
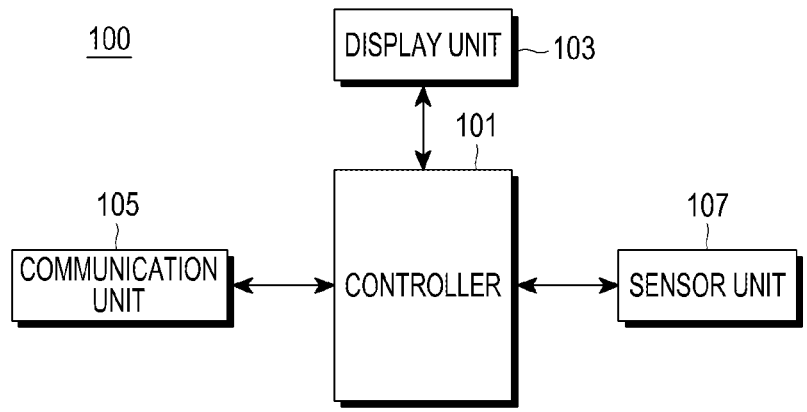
FIGS. 1A and 1B are block diagrams illustrating an example electronic device.

Hereinafter, various examples of the disclosure will be disclosed with reference to the accompanying drawings. However, the disclosure is not intended to be limited to particular examples, and it should be understood to include various modifications, equivalents, and/or alternatives according to the examples of the disclosure. In regard to the description of the drawings, like reference numerals refer to like elements.

In the disclosure, an expression such as "having," "may have," "comprising," or "may comprise" indicates existence of a corresponding characteristic (such as an element such as a numerical value, function, operation, or component) and does not exclude existence of an additional characteristic.

In the disclosure, an expression such as "A or B," "at least one of A or/and B," or "one or more of A or/and B" may include all possible combinations of the listed items. For example, "A or B," "at least one of A and B," or "one or more of A or B" may indicate the entire of (1) including at least one A, (2) including at least one B, or (3) including both at least one A and at least one B.

Expressions such as "first," "second," "primary," or "secondary," used in various example embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element may be directly connected to the other element or may be connected to the other element through a third element. However, when it is described that an element (such as a first element) is "directly connected" or "directly coupled" to another element (such as a second element), it may refer to the situation in which there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may refer to an apparatus that "can" operate together with another apparatus or component. For example, a phrase "a processor configured (or set) to perform A, B, and C" may be a general-purpose processor (such as a CPU or an application processor) that can perform a corresponding operation by executing at least one software program stored at an exclusive processor (such as an embedded processor) for performing a corresponding operation or at a memory device.

Terms defined in the disclosure are used for only describing a specific example embodiment and may not have an intention to limit the scope of other example embodiments. When using in a description of the disclosure and the appended claims, a singular form may include a plurality of forms unless it is explicitly differently represented. Entire terms including a technical term and a scientific term used here may have the same meaning as a meaning that may be generally understood by a person of ordinary skill in the art. It may be understood that terms defined in general dictionaries among terms used herein have the same meaning as or a meaning similar to that of a context of related technology and are not to be understood as an ideal or excessively formal meaning unless explicitly defined. The terms defined in the disclosure cannot be construed to exclude the example embodiments.

In the disclosure, a "module" or "unit" performs at least one function or operation and may be implemented with hardware (e.g., circuitry), software, or a combination thereof. In addition, a plurality of "modules" or a plurality of "units" may be integrated into at least one modules and may be implemented with at least one processors (not shown), except for a "module" or "unit" that needs to be implemented with particular hardware.

An application may refer to software that is used while being executed on a computer Operating System (OS) or a mobile OS. For example, the application may include a word processor application, a spread sheet application, a contact application, a calendar application, a memo application, an alarm application, a Social Network System (SNS) application, a chatting application, a map application, a music player application, or a video player application, or the like. In the disclosure, an application may refer to software executed in an electronic device 100 or a wearable device (e.g., a smart watch or the like) connected wirelessly or by wire with the electronic device 100. An application according to an example of the disclosure may refer to software executed in the electronic device 100 in response to a received input.

In the disclosure, a wearable device may refer to an electronic device that is wearable on a body, such as glasses, a watch, or the like, and is capable of interacting with a user. The wearable device may detect user's biometric information (e.g., a blood pressure, a heartbeat, a body temperature, brain waves, and so forth) and user's surrounding environment information (e.g., a temperature, humidity, an altitude, ultraviolet (UV) rays, and the like), etc. The wearable device may perform wireless communication with the electronic device 100 and/or a base station. The wearable device may include, for example, a touch screen and various sensors.

In an example of the disclosure, to implement a method for representing to a user context-based multi-modal web content, surrounding information may be collected using a sensor of an electronic device and a sensor of an external device to recognize an execution environment of the electronic device of a user, and a visual web content may be converted into various modality information, such as voice, vibration, or the like, based on an identified intention or a user and context based on characteristics of the electronic device and the external device, and is provided to the user.

In an example of the disclosure, conversion of a web page into first modality information may refer, for example, to conversion of an object included in the web page into the first modality information.

In an example of the disclosure, conversion of a web page into voice may refer, for example, to conversion of the object included in the web page, e.g., text data included in the web page, into voice data, that is, voice information. Conversion of at least a portion of the web page into voice may refer, for example, to conversion of a portion of the object included in the web page, e.g., a portion of the text data included in the web page, into voice data, that is, voice information.

In an example of the disclosure, a first area may refer to an object included in the first area. A second area may refer to an object included in the second area.

Hereinafter, an example of the disclosure will be described in greater detail with reference to the accompanying drawings, and identical or corresponding elements will be referred to as identical reference numerals and a repetitive description thereof may not be provided.

Figure 1B:
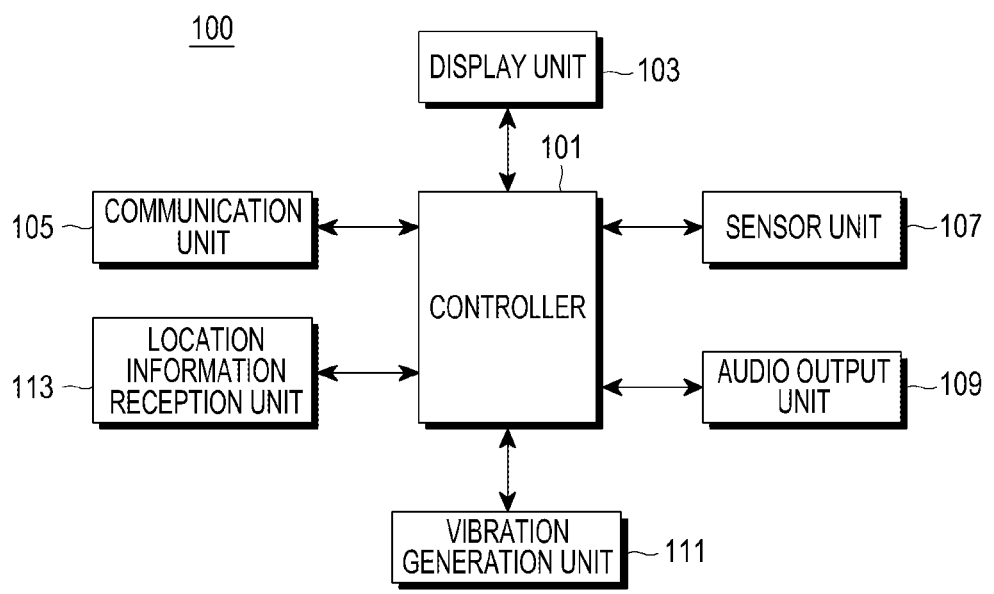

FIGS. 1A and 1B are block diagrams an example electronic device 100. In an example of the disclosure, a web page may be provided through voice and a link object. For example, the electronic device 100 may be configured to sense surrounding environment information through a sensor unit (e.g., including at least one sensor) 107 of the electronic device 100 to determine a situation where a user uses the electronic device 100, and provides a web page by automatically combining the voice and the link object.

For example, when the user is exercising, the user may be provided with a web page through voice data in the electronic device 100 and may be provided with a link object for selecting a web page in a smart watch. When the user holding the electronic device 100 is driving a vehicle, the user may be provided with a web page through voice using, for example, in-vehicle infotainment (IVI) and may be provided with a link object or the web page through, for example, a head up display (HUD).

Referring to FIG. 1A, a controller 101, a display unit (e.g., including a display) 103, a communication unit (e.g., including communication circuitry) 105, and a sensor unit (e.g., including a sensor) 107 are illustrated. The controller 101 may include, for example, a processor, a read only memory (ROM) having stored therein a control program for controlling the electronic device 100, and a random access memory (RAM) having stored therein a signal or data input from the outside of the electronic device 100 or used as a storage area for various tasks performed in the electronic device 100. The controller 101 may be configured to control overall operation of the electronic device 100 and a signal flow between internal elements of the electronic device 100 and to process data.

The controller 101 may be configured to convert at least a portion of a first web page displayed in the display unit 103 into first modality information based on a signal output from the sensor unit 107. For example, at least a portion of a text and a graphic object included in the first web page may be converted into modality other than visual modality, e.g., voice modality.

The controller 101 may be configured to convert at least a portion of the first web page displayed on the display unit 103 into voice data based on the signal output from the sensor unit 107, and to transmit the at least a portion of the first web page to an external device based on received context information regarding the external device 200.

The controller 101 may be configured to convert the first web page displayed on the display unit 103 into information that may be processed or is processible by an external device 200 based on context information of the external device 200. For example, if the external device 200 has no display unit, the controller 101 may be configured to convert the first web page into voice information.

The controller 101 may be configured to convert the at least a portion of the first web page displayed on the display unit 103 into the first modality information based on a signal output from the location information reception unit (e.g., including a location information receiver) 113. For example, if determining that the electronic device 100 is in a theater based on the signal output from the location information reception unit 113, the controller 101 may be configured to convert the first web page into voice information.

The controller 101 may be configured to output the at least a portion of the first web page to the external device 200 through the communication unit 105 based on security information of the first web page displayed on the display unit 103. The security information may be included in the first web page.

The first web page may include, for example, a first area and a second area. The first area may, for example, be a higher-level menu of the second area. For example, the first area may be a category of a newspaper article, and the second area may be newspaper article contents. The first area may be a broadcasting channel name, and the second area may be a program name included in the same channel.

The controller 101 may be configured to convert at least one of the first area and the second area into voice data based on the signal output from the sensor unit 107, and to transmit the first area to an external device based on the received context information regarding the external device 200. The controller 101 may be configured to convert the first area into information that is processible by the external device, based on the received context information regarding the external device 200. The received context information regarding the external device 200 may, for example, be information indicating a function of the external device, e.g., whether the display unit exists and whether an audio output unit exists.

If the external device has the audio output unit (e.g., audio output circuitry) without the display unit, the controller 101 may be configured to convert the first area into voice information that is processible by the external device.

The display unit 103 may, for example, be a display panel such as a liquid crystal display (LCD), an active matrix organic light emitting diode (AMOLED), or the like. The display unit 103 displays various operation contexts of the electronic device 100 and various screens corresponding to application execution and services. The display unit 103 may, for example, be a touchscreen capable of sensing a touch, and may include, for example, a touch sensing unit and a display panel. The touch sensing unit may be located under the display panel. The display unit 103 may display content. The content may, for example, be a web page, an electronic book (E-book) page, an application execution screen, a still image, or video, or the like. The content may be a graphic object and a user interface element.

The communication unit 105 may connect a mobile communication network with the external device 200 using, for example, one or more antennas under control of the controller 101. The communication unit 105 may include, for example, a mobile communication unit and may transmit/receive voice call, video call, a short messaging service (SMS) message, a multimedia service (MMS) message, and a wireless signal for data communication, or the like.

The communication unit 105 may include, for example, a wireless local area network (WLAN) and may be wirelessly connected with an access point (AP) under control of the controller 101. The communication unit 105 may include, for example, a short-range communication unit and perform wireless short-range communication with the external device 200 without an AP under control of the controller 101. The short-range communication may include, for example, Bluetooth, Bluetooth low energy (BLE), infrared data association (IrDA), wireless fidelity (Wi-Fi), ultra-wideband (UWB), near field communication (NFC), and so forth.

In an example of the disclosure, the communication unit 105 may be configured to communicate with the external device 200. The communication unit 105 may receive a first signal from the external device 200. The first signal may include context information of the external device 200. The communication unit 105 may receive a second signal from the external device 200. The second signal may be a signal that is output by the external device 200 in response to an input. For example, the second signal may be generated when the user touches the link object displayed on the external device 200. The link object displayed on the external device 200 may, for example, be a text. The link object displayed on the external device 200 may, for example, be a graphic object. The link object displayed on the external device 200 may be a portion of the link object included in the first web page displayed on the display unit 103 of the electronic device 100. The link object displayed on the external device 200 may be the same as a plurality of link objects included in the first web page displayed on the display unit 103 of the electronic device 100. When at least some of the plurality of link objects included in the first web page are displayed on the external device 200, if the user selects one of the displayed link objects, the external device 200 may transmit the second signal to the electronic device 100 based on a user's selection.

For example, upon reception of an input from the external device 200, the external device 200 may output the second signal to the electronic device 100 in response to the received input. The second signal may be a signal based on the input for selecting one of the link objects included in the first web page in the external device 200.

The sensor unit 107 senses a context of the electronic device 100 and a context of the surroundings of the electronic device 100. The sensor unit 107 may include at least one sensor that detects the context of the electronic device 100. For example, the sensor unit 107 may include a proximity sensor that detects whether the user approaches the electronic device 100, an illumination sensor that detects the amount of light around the electronic device 100, and a gyro sensor that detects a direction by using rotational inertia of the electronic device 100. The sensor unit 107 may include an acceleration sensor (not shown) that detects an acceleration applied to three axes (e.g., an X axis, a Y axis, and a Z axis) of the electronic device 100, a gravity sensor that detects a direction in which gravity is applied, or an altimeter that detects an altitude by measuring a pressure of the air.

The sensor unit 107 may detect a motional acceleration and a gravitational acceleration of the electronic device 100. In case of the electronic device 100 being fixed, the sensor unit 107 may detect only the gravity acceleration. For example, if a front surface of the electronic device 100 is directed upward, the gravity acceleration has a positive (+) direction; if a rear surface of the electronic device 100 is directed upward, the gravity acceleration has a negative (−) direction. The sensor unit 107 may further include a fingerprint sensor (not shown) that detects a user's fingerprint, an UV sensor (not shown) that detects surrounding UV rays, or a heartbeat sensor (not shown) that detects a user's heartbeat.

The sensor included in the sensor unit 107 may detect the context of the electronic device 100 and transmit an electric signal corresponding to the detection to the controller 101. In an example of the disclosure, the controller 101 may be configured to determine the context of the electronic device 100 based on a signal output from the sensor unit 107. For example, the controller 101 may be configured to determine whether the display unit 103 of the electronic device 100 is covered with a cover using an output of the illumination sensor. The controller 101 may be configured to determine whether the electronic device 100 is in user's bag using an output of the illumination sensor. The controller 101 may be configured to determine whether the electronic device 100 is moving using an output of the acceleration sensor. It would be easily understood by those of ordinary skill in the art that the sensor included in the sensor unit 107 may be added or removed based on desired capabilities of the electronic device 100.

Referring to FIG. 1B, the controller 101, the display unit (e.g., including a display) 103, the communication unit (e.g., including communication circuitry) 105, the sensor unit (e.g., including a sensor) 107, an audio output unit (e.g., including audio output circuitry) 109, a vibration generation unit (e.g, including vibration generation circuitry) 111, and a location information reception unit (e.g., including a location information receiver) 113.

The controller 101 may include, for example, a processor, a ROM having stored therein a control program for controlling the electronic device 100, and a RAM having stored therein a signal or data input from the outside of the electronic device 100 or used as a storage area for various tasks performed in the electronic device 100. The controller 101 may be configured to control overall operation of the electronic device 100 and a signal flow between internal elements of the electronic device 100 and processes data. The controller 101 may be configured to convert at least a portion of a first web page displayed on the display unit 103 into first modality information based on a signal output from the sensor unit 107. For example, the controller 101 may be configured to convert at least a portion of a text and a graphic object included in the first web page into modality information other than visual modality, e.g., voice modality. For example, the controller 101 may be configured to convert at least a portion of the first web page displayed on the display unit 103 into voice information based on the signal output from the sensor unit 107, and to transmit the at least a portion of the first web page to an external device based on received context information regarding the external device 200.

The controller 101 may be configured to convert the first web page displayed on the display unit 103 into information that is processible by the external device 200, based on context information of the external device 200. The controller 101 may be configured to convert the at least a portion of the first web page displayed on the display unit 103 into the first modality information based on a signal output from the location information reception unit 113. The controller 101 may be configured to output the at least a portion of the first web page to the external device 200 through the communication unit 105 based on security information included in the first web page displayed on the display unit 103.

The display unit 103 may, for example, be a panel such as an LCD, an AMOLED, or the like. The display unit 103 may display various operation contexts of the electronic device 100 and various screens corresponding to application execution and services. The display unit 103 may be a touch screen capable of sensing a touch, and may include a touch sensing unit and a display panel. The touch sensing unit may be disposed under the display panel. In the display unit 103, content may be displayed. The content may, for example, be a web page, an E-book page, an application execution screen, still images, and moving images, or the like. The content may include, for example, a graphic object and a user interface element, or the like.

The communication unit 105 may be connected with the external device 200 through a mobile communication network by using one or more antennas under control of the controller 101. The communication unit 105 may include a mobile communication unit and may transmit/receive a voice call, a video call, an SMS message, an MMS message, and a wireless signal for data communication, or the like.

The communication unit 105 may include a WLAN, and may be wirelessly connected with an AP under control of the controller 101. The communication unit 105 may include a short-range communication unit and may wirelessly perform short-range communication with the external device 200 without an AP under control of the controller 101. The short-range communication may include, for example, Bluetooth, BLE, IrDA, Wi-Fi, UWB, NFC, and so forth.

In an example of the disclosure, the communication unit 105 may be configured to communicate with the external device 200. The communication unit 105 may, for example, receive a first signal from the external device 200. The first signal may include context information of the external device 200. The communication unit 105 may, for example, receive a second signal from the external device 200. The second signal may be a signal output by the external device 200 in response to an input generated in the external device 200. For example, the second signal may be generated when the user touches a link object displayed in the external device 200. The link object may be a text. The link object may be a graphic object. The link object may be a portion of a link object included in the first web page. The link object may be the same as a plurality of link objects included in the first web page. When at least some of the link objects included in the first web page are displayed in the external device 200, if the user selects one link object, the external device 200 transmits the second signal to the electronic device 100 based on a user's selection.

For example, upon receiving an input, the external device 200 outputs the second signal to the electronic device 100 in response to the reception of the input. The second signal may be a signal based on an input selecting one of link objects included in the first web page in the external device 200.

The sensor unit 107 senses a context of the electronic device 100 and a context of the surroundings of the electronic device 100. The sensor unit 107 may include, for example, at least one sensor for detecting the context of the electronic device 100. For example, the sensor unit 107 may include a proximity sensor that detects whether the user approaches the electronic device 100, an illumination sensor that detects the amount of light around the electronic device 100, and a gyro sensor that detects a direction using rotational inertia of the electronic device 100. The sensor unit 107 may include an acceleration sensor (not shown) that detects an acceleration applied to three axes (e.g., an X axis, a Y axis, and a Z axis) of the electronic device 100, a gravity sensor that detects a direction in which gravity is applied, or an altimeter that detects an altitude by measuring a pressure of the air.

The sensor unit 107 may detect a motional acceleration and a gravitational acceleration of the electronic device 100. In case of the electronic device 100 being fixed, the sensor unit 107 may detect only the gravity acceleration. For example, if a front surface of the electronic device 100 is directed upward, the gravity acceleration has a positive (+) direction; if a rear surface of the electronic device 100 is directed upward, the gravity acceleration has a negative (−) direction. The sensor unit 107 may further include a fingerprint sensor (not shown) that detects a fingerprint, an UV sensor (not shown) that detects surrounding UV rays, or a heartbeat sensor (not shown) that detects a user's heartbeat.

The sensor included in the sensor unit 107 detects the context of the electronic device 100 and transmits an electric signal corresponding to the detection to the controller 101. In an example of the disclosure, the controller 101 may be configured to determine the context of the electronic device 100 based on a signal output from the sensor unit 107. For example, the controller 101 may be configured to determine whether the display unit 103 of the electronic device 100 is covered with a cover using an output of the illumination sensor. The controller 101 may be configured to determine whether the electronic device 100 is in user's bag using an output of the illumination sensor. The controller 101 may be configured to determine whether the electronic device 100 is moving using an output of the acceleration sensor.

The audio output unit 109 may include, for example, a speaker or an earphone jack embedded in the electronic device 100 and may play voice synthesized in the electronic device 100, a sound source stored in a storage unit (not shown), and an audio source (e.g., an audio file having a file extension, 'mp3', 'wma', 'ogg', or 'wav') received from outside using, for example, an audio codec and outputs them in the form of voice. It would be easily understood by those of ordinary skill in the art that various types of audio codecs capable of playing audio files having various file extensions have been produced and sold. In an example of the disclosure, the audio output unit 109 outputs at least a portion of information included in the first web page displayed on the display unit 103 in the form of voice data under control of the controller 101. For example, the controller 101 may be configured to control the audio output unit 109 to convert a text included in the first web page into voice data using a text to speech (TTS) engine and to output the voice. The text may include a link object.

The vibration generation unit 111 may include, for example, a vibration motor, and may convert an electric signal into mechanical vibration under control of the controller 101. The vibration motor may include, for example, a linear vibration motor, a bar type vibration, a coin type vibration motor, or a piezoelectric element vibration motor, or the like. The vibration motor may vibrate the entire electronic device 100 or only a portion thereof. According to an example of the disclosure, the vibration generation unit 111 may output at least a portion of information included in the first web page displayed on the display unit 103 in the form of vibration under control of the controller 101. For example, if the controller 101 converts a text included in the first web page into voice data using the TTS engine, the controller 101 may be configured to control the vibration generation unit 111 to generate vibration for a text including a link object.

The location information reception unit 113 may, for example, include a GPS receiver. The GPS receiver periodically receives a signal (e.g., orbit information of a GPS satellite, time information of a satellite, and a navigation message) from a plurality of GPS satellites on the orbit of Earth. In an outdoor environment, the electronic device 100 may determine locations of the plurality of GPS satellites and a location of the electronic device 100 using signals received from the plurality of GPS satellites, and determine a distance using a transmission/reception time difference. The electronic device 100 may determine a location, a time, or a moving speed of the electronic device 100 through triangulation. For orbit correction or time correction, an additional GPS satellite may be needed.

In an indoor environment, the electronic device 100 may detect a location or moving speed of the electronic device 100 using a wireless AP (not shown). In the indoor environment, location detection of the electronic device 100 may use a cell-ID scheme using an ID of a wireless AP, an enhanced cell-ID scheme using an ID and a received signal strength (RSS) of the wireless AP, or an angle of arrival (AoA) scheme using an angle at which a signal transmitted from the AP is received by the electronic device 100, or the like. The electronic device 100 may detect a location or moving speed of the electronic device 100 located in an indoor environment using a wireless beacon (not shown). It would be easily understood by those of ordinary skill in the art that an indoor position of the electronic device 100 may be detected using various schemes as well as the aforementioned schemes.

In an example of the disclosure, the controller 101 may be configured to determine an outdoor location using the location information reception unit 113 or an indoor location using a wireless AP. The controller 101 may be configured to convert at least a portion of the first web page displayed on the display unit 103 into first modality information based on a signal output from the location information reception unit 113. For example, if the electronic device 100 is situated in a theater, the controller 101 may be configured to convert the first web page displayed on the display unit 103 into voice data.

The controller 101 may be configured to convert the first web page displayed on the display unit 103 into first modality information based, for example, on importance. The modality may refer to a sense used by the user for interaction with the electronic device 100. The modality may be used for data input and output and media control. The first modality may be voice data or a tactile sense. Although the following description assumes that the first modality information is voice information, the same method may be applied to tactile modality, or any other modality.

When the first web page is displayed on the display unit 103, the controller 101 may be configured to convert at least a portion of the first web page into the first modality information based on a signal output from the sensor unit 107. The signal output from the sensor unit 107 may include information about a context of the sensor unit 107. The controller 101 may be configured to receive the signal output from the sensor unit 107 to determine the context of the electronic device 100. For example, the controller 101 may be configured to receive and analyze a signal output from the illumination sensor included in the sensor unit 107 to determine whether the user stares at the display unit 103 of the electronic device 100. The controller 101 may be configured to receive and analyze the signal output from the illumination sensor included in the sensor unit 107 to determine whether the display unit 103 of the electronic device 100 is covered with a cover. The controller 101 may be configured to receive and analyze the signal output from the illumination sensor included in the sensor unit 107 to determine whether the electronic device 100 is in a bag. If determining that the electronic device 100 is in a bag, the display unit 103 of the electronic device 100 is covered with the cover, or that the user does not stare at the display unit 103 of the electronic device 100, the controller 101 may be configured to convert a portion of the first web page displayed on the display unit 103 or the entire first web page into voice data using, for example, a TTS engine. The first web page converted into voice data may be output through the audio output unit 109 in the form of voice.

The controller 101 may be configured to convert a portion of the first web page into the first modality information by referring to importance information included in the first web page. For example, the controller 101 may be configured to convert the portion of the first web page into voice modality referring to the importance information included in the first web page. The importance information may indicate importance information regarding the entire first web page or the importance may vary with particular content included in the first web page, e.g., a text corresponding to a particular keyword.

Figure 2A:
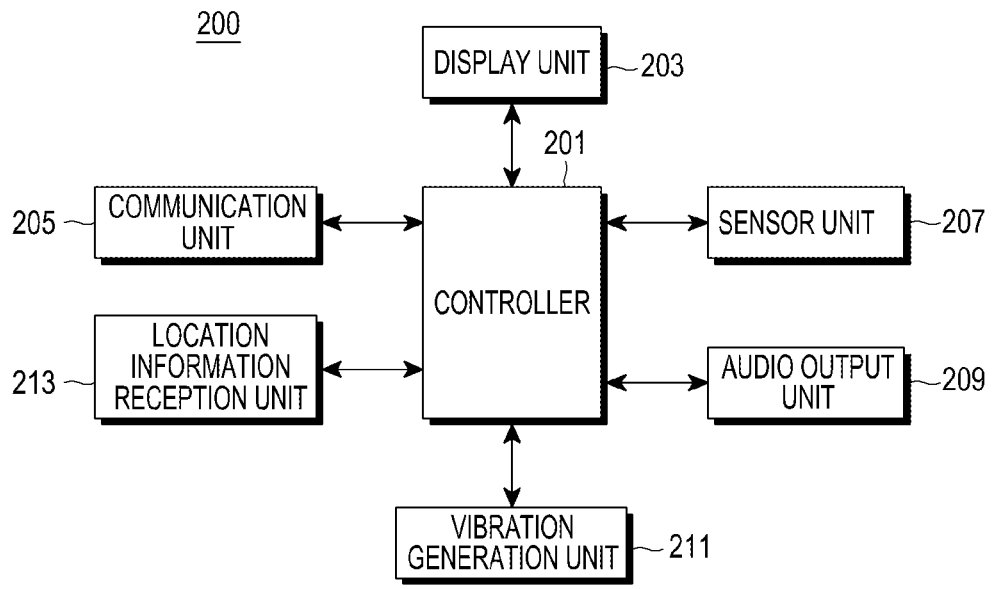
FIGS. 2A and 2B are block diagrams illustrating an example external device.
Figure 2B:
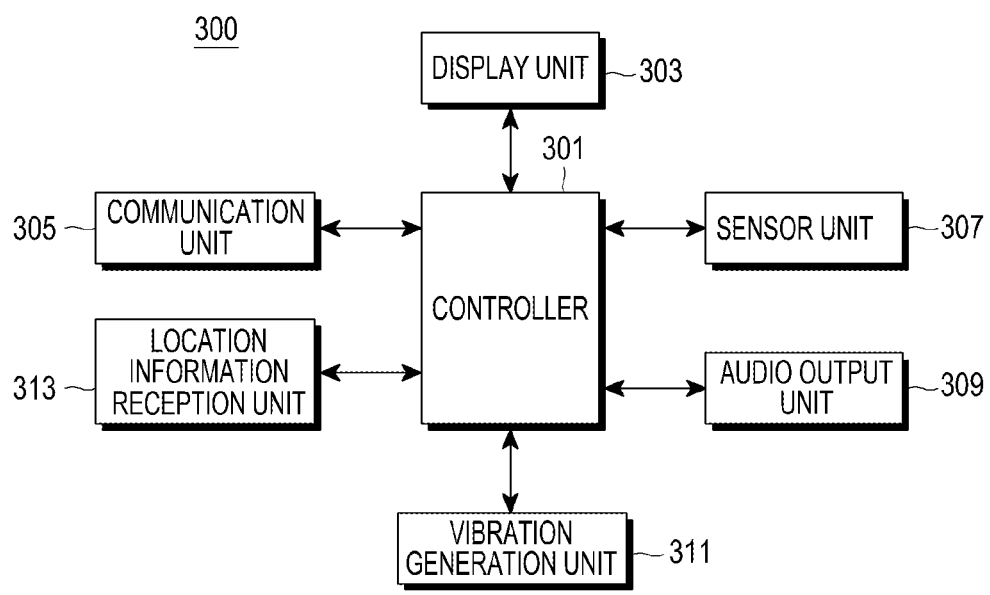

FIGS. 2A and 2B are block diagrams illustrating an example external device.

Referring to FIG. 2A, a controller 201, a display unit 203, a communication unit 205, a sensor unit 207, an audio output unit 209, a vibration generation unit 211, and a location information reception unit 213 are shown. The external device 200 may be a wearable device.

The controller 201 may include a processor, a ROM having stored therein a control program for controlling the external device 200, and a RAM having stored therein a signal or data input from the outside of the external device 200 or used as a storage area for various tasks performed in the external device 200. The controller 201 may be configured to control overall operation of the external device 200 and a signal flow between internal elements of the external device 200 and processes data.

The display unit (e.g., including a display) 203 may, for example, include a panel like an LCD, an AMOLED, or the like. The display unit 203 may display various operation contexts of the external device 200 and various screens corresponding to application execution and services. The display unit 203 may be a touch screen capable of sensing a touch, and may include a touch sensing unit and a display panel. The touch sensing unit may be disposed under the display panel. In the display unit 203, a portion of a first web page transmitted from the electronic device 100 may be displayed. The portion of the first web page may be a link object. The content may, for example, be a web page, an E-book page, an application execution screen, still images, and moving images. The content may be a graphic object and a user interface element, or the like.

The communication unit (e.g., including communication circuitry) 205 may be connected with a mobile communication network using one or more antennas under control of the controller 201. The communication unit 205 may include a mobile communication unit and may transmit/receive a voice call, a video call, an SMS message, an MMS message, and a wireless signal for data communication, or the like.

The communication unit 205 may include a WLAN, and may be wirelessly connected with an AP under control of the controller 201. The communication unit 205 may include a short-range communication unit and may wirelessly perform short-range communication with the electronic device 100 without an AP under control of the controller 201. The short-range communication may include, for example, Bluetooth, BLE, IrDA, Wi-Fi, UWB, NFC, and so forth.

In an example of the disclosure, the communication unit 205 may communicate with the electronic device 100. The communication unit 205 may receive first web page information from the electronic device 100. The first web page may include a link object.

The sensor unit (e.g., including a sensor) 207 senses a context of the external device 200 and a context of the surroundings of the external device 200. The sensor unit 207 may include at least one sensor that detects the context of the external device 200. For example, the sensor unit 207 may include a proximity sensor that detects whether the user approaches the external device 200, an illumination sensor that detects the amount of light around the external device 200, and a gyro sensor that detects a direction by using rotational inertia of the external device 200. The sensor unit 207 may include an acceleration sensor (not shown) that detects an acceleration applied to three axes (e.g., an X axis, a Y axis, and a Z axis) of the external device 200, a gravity sensor that detects a direction in which gravity is applied, or an altimeter that detects an altitude by measuring a pressure of the air.

The sensor unit 207 may detect a motional acceleration and a gravitational acceleration of the external device 200. The sensor unit 207 may further include a fingerprint sensor (not shown) that detects a fingerprint, an UV sensor (not shown) that detects surrounding UV rays, or a heartbeat sensor (not shown) that detects a user's heartbeat, etc.

The sensor included in the sensor unit 207 detects the context of the external device 200 and transmits an electric signal corresponding to the detection to the controller 201. In an example of the disclosure, the controller 201 may be configured to determine the context of the electronic device 200 based on a signal output from the sensor unit 207.

The controller 201 may be configured to use an output of the illumination sensor to determine whether the external device 200 is in a bag. The controller 201 may be configured to use an output of the acceleration sensor to determine whether the external device 200 is moving.

The audio output unit (e.g., including audio output circuitry) 209 may include a speaker or an earphone jack embedded in the external device 200 and may play voice synthesized in the external device 200, a sound source stored in a storage unit (not shown), and an audio source (e.g., an audio file having a file extension, 'mp3', 'wma', 'ogg', or 'wav') received from outside by using, for example, an audio codec and outputs them in the form of voice. It would be easily understood by those of ordinary skill in the art that various types of audio codecs capable of playing audio files having various file extensions have been produced and sold.

The vibration generation unit (e.g., including vibration generation circuitry) 211 may include, for example, a vibration motor, and converts an electric signal into mechanical vibration under control of the controller 201. The vibration motor may include, for example, a linear vibration motor, a bar type vibration, a coin type vibration motor, or a piezoelectric element vibration motor, or the like. The vibration motor may vibrate the entire external device 200 or only a portion thereof.

The location information reception unit (e.g., including a location information receiver) 213 may, for example, include a GPS receiver. The GPS receiver periodically receives a signal (e.g., orbit information of a GPS satellite, time information of a satellite, and a navigation message) from a plurality of GPS satellites on the orbit of Earth. In an outdoor environment, the external device 200 determines locations of the plurality of GPS satellites and a location of the external device 200 using signals received from the plurality of GPS satellites, and determines a distance using a transmission/reception time difference. The external device 200 may determine a location, a time, or a moving speed of the external device 200 through triangulation. For orbit correction or time correction, an additional GPS satellite may be needed.

In an indoor environment, the external device 200 may detect a location or moving speed of the external device 200 using a wireless AP (not shown).

In the indoor environment, location detection of the electronic device 100 may use a cell-ID scheme using an ID of a wireless AP, an enhanced cell-ID scheme using an ID and a received signal strength (RSS) of the wireless AP, or an angle of arrival (AoA) scheme using an angle at which a signal transmitted from the AP is received by the electronic device 100, or the like. The electronic device 100 may detect a location or moving speed of the electronic device 100 located in an indoor environment using a wireless beacon (not shown). It would be easily understood by those of ordinary skill in the art that an indoor position of the electronic device 100 may be detected using various schemes as well as the aforementioned schemes.

In an example of the disclosure, the controller 201 may be configured to determine an outdoor location using the location information reception unit 213 or an indoor location using a wireless AP.

Referring to FIG. 2B, a controller 301, a display unit (e.g., including a display) 303, a communication unit (e.g., including communication circuitry) 305, a sensor unit (e.g., including a sensor) 307, an audio output unit (e.g., including audio output circuitry) 309, a vibration generation unit (e.g., including vibration generation circuitry) 311, and a location information reception unit (e.g., including a location information receiver) 313 are illustrated. An external device 300 may, for example, be an IVI mounted on a vehicle.

The controller 301 may include a processor, a ROM having stored therein a control program for controlling the external device 300, and a RAM having stored therein a signal or data input from the outside of the external device 300 or used as a storage area for various tasks performed in the external device 300. The controller 301 may be configured to control overall operation of the external device 300 and a signal flow between internal elements of the external device 300 and processes data.

The display unit 303 may, for example, be a HUD. The display unit 303 may display various operation contexts of the electronic device 300 and various screens corresponding to application execution and services. The display unit 303 may, for example, include a touchscreen capable of sensing a touch, and may include a touch sensing unit and a display panel. The touch sensing unit may be located under the display panel.

In the display unit 303, a portion of a first web page transmitted from the electronic device 100 may be displayed. The portion of the first web page may include a link object. Content may be displayed on the display unit 303. The content may be a web page, an E-book page, an application execution screen, still images, and moving images, or the like. The content may be a graphic object and a user interface element, or the like.

The communication unit 305 may be connected to a mobile communication network using one or more antennas under control of the controller 301. The communication unit 305 may include a mobile communication unit and may transmit/receive a voice call, a video call, an SMS message, an MMS message, and a wireless signal for data communication, or the like.

The controller 305 may include a short-range communication unit and may wirelessly perform short-range communication with the electronic device 100 without an AP under control of the controller 101. The short-range communication may include, for example, Bluetooth, BLE, IrDA, Wi-Fi, UWB, NFC, and so forth.

In an example of the disclosure, the communication unit 305 may communicate with the electronic device 100. The communication unit 305 may receive first web page information from the electronic device 100. The first web page may include a link object.

The sensor unit 307 senses a context of the external device 300 and a context of the surroundings of the external device 300. The sensor unit 307 may include at least one sensor that detects the context of the external device 300. For example, the sensor unit 307 may include a proximity sensor that detects whether the user approaches the external device 300, an illumination sensor that detects the amount of light around the external device 300, and a gyro sensor that detects a direction using rotational inertia of the external device 300. The sensor unit 307 may include an acceleration sensor (not shown) that detects an acceleration applied to three axes (e.g., an X axis, a Y axis, and a Z axis) of the external device 300, a gravity sensor that detects a direction in which gravity is applied, or an altimeter that detects an altitude by measuring a pressure of the air.

The sensor unit 207 may detect a motional acceleration and a gravitational acceleration of the external device 300. The sensor unit 207 may further include a fingerprint sensor (not shown) that detects a fingerprint, an UV sensor (not shown) that detects surrounding UV rays, or a heartbeat sensor (not shown) that detects a user's heartbeat, or the like.

The sensor included in the sensor unit 307 may detect the context of the external device 300 and transmit an electric signal corresponding to the detection to the controller 301. In an example of the disclosure, the controller 301 may be configured to determine the context of the electronic device 300 based on a signal output from the sensor unit 307.

The controller 301 may be configured to use an output of the acceleration sensor to determine whether the external device 300 is moving.

The audio output unit 309 may include a speaker or an earphone jack embedded in the external device 300 and may play voice synthesized in the external device 300, a sound source stored in a storage unit (not shown), and an audio source (e.g., an audio file having a file extension, 'mp3', 'wma', 'ogg', or 'wav') received from outside using, for example, an audio codec and outputs them in the form of voice. It would be easily understood by those of ordinary skill in the art that various types of audio codecs capable of playing audio files having various file extensions have been produced and sold.

The vibration generation unit 311 may include, for example, a vibration motor, and may convert an electric signal into mechanical vibration under control of the controller 301. The vibration motor may include, for example, a linear vibration motor, a bar type vibration, a coin type vibration motor, or a piezoelectric element vibration motor, or the like. The vibration motor may vibrate the entire external device 300 or only a portion thereof.

The location information reception unit 313 may include a GPS receiver. The GPS receiver periodically receives a signal (e.g., orbit information of a GPS satellite, time information of a satellite, and a navigation message) from a plurality of GPS satellites on the orbit of Earth. In an outdoor environment, the external device 300 determines locations of the plurality of GPS satellites and a location of the external device 300 using signals received from the plurality of GPS satellites, and determines a distance using a transmission/reception time difference. The external device 300 may determine a location, a time, or a moving speed of the external device 300 through triangulation. For orbit correction or time correction, an additional GPS satellite may be needed.

Figure 3:
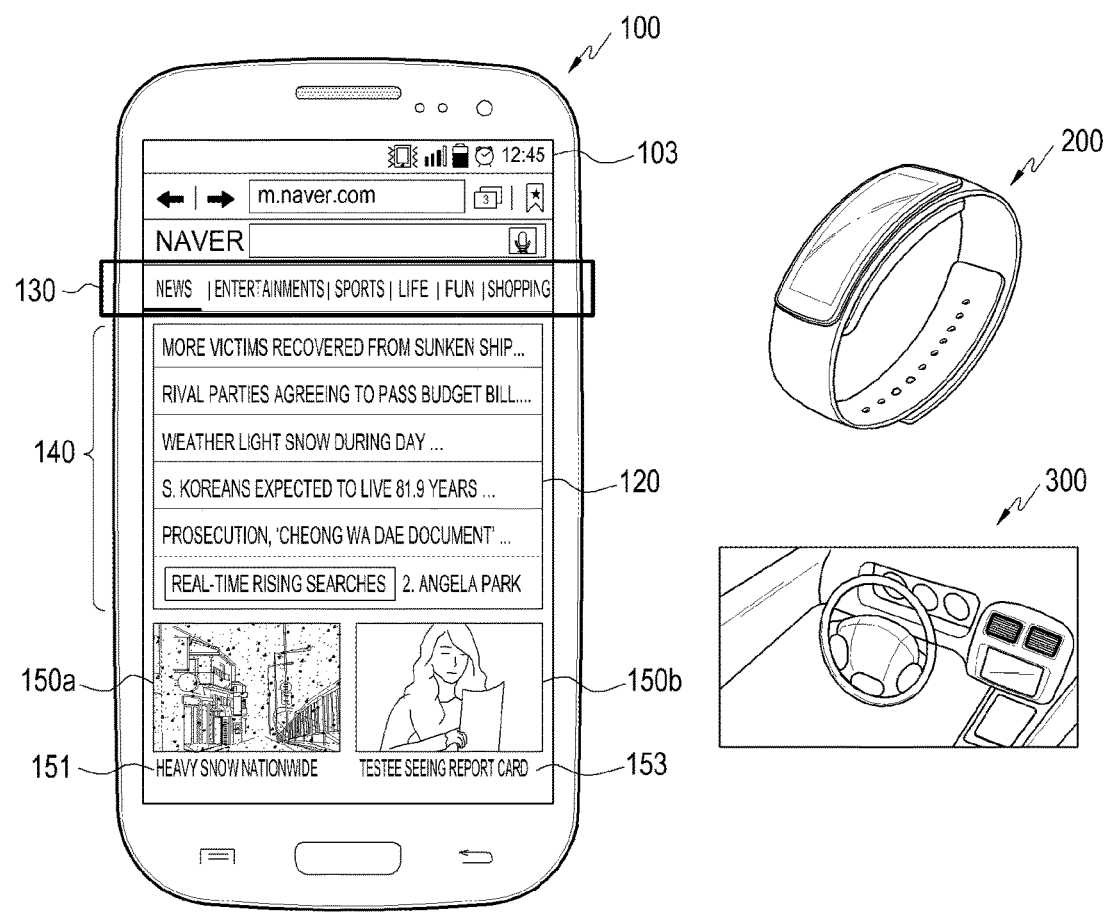
FIG. 3 illustrates an example electronic device and an example external device.

FIG. 3 illustrates an example electronic device and an example external device. Referring to FIG. 3, the electronic device 100 and the external devices 200 and 300 are illustrated. Hereinafter, a description will be made with reference to FIGS. 2A, 2B, and 3. On the display unit 103 of the electronic device 100, a first web page is displayed. The first web page may include a link object and a normal object. The link object includes link information and may be a content item such as first texts in a first area 130, second texts in a second area 140, images 150*a* and 150*b*, or video, a button item, or a menu item, or the like. The first web page may include a normal object having no link information. The normal object may, for example, be a content item such as a text, an image, or video, a button item, or a menu item, or the like.

The controller 101 may be configured to convert the link object and the normal object included in the first web page into voice data using a TTS engine. If the link object and the normal object are texts, the first and second texts including link information may be converted into voice data that is different that of normal texts 151 and 153. For example, a text including link information may be converted into a female voice and a normal text including no link information may be converted into a male voice. The first and second texts, 151, and 153 may be given priorities based on their importance. The first web page may include importance information regarding an object, e.g., a text. The first web page may also include importance information regarding the page itself. The controller 101 may be configured to determine a position of a text displayed on the display unit 103 based on the importance of the text. The controller 101 may be configured to dispose a text having higher importance in an upper area of the display unit 103. For example, the first area 130 indicates a category of content and is displayed in an upper area of the display unit 103. The text 140 has lower importance than the first area 130 and is displayed in a middle area of the display unit 103. Images 150a and 150b and the texts 151 and 153 showing a description of the images 150a and 150b have lower importance than that of the second area 140 and thus are displayed in a lower area of the display unit 103. The importance information may be expressed using numbers. For example, if an importance level ranges from 1 to 10, the first area 130 may have an importance level of '10'. The second area 140 may have an importance level of '7'. The texts 151 and 153 may have an importance level of '5'.

The controller 101 may be configured to transmit at least a portion of the first web page to the external device 200 through the communication unit 105 based on importance information included in the first web page. For example, the controller 101 may be configured to transmit the first text in the first area 130 having higher importance to the external device 200 through the communication unit 105. In this case, the controller 101 may be configured to not convert the first text to be transmitted to the external device 200 into voice data.

The controller 101 may be configured to transmit a portion of the first web page to the external device 200 through the communication unit 105 and may be configured to convert the other portion of the first web page into voice data, based on the importance information included in the first web page. For example, the controller 101 may be configured to transmit the first text having higher importance to the external device 200 through the communication unit 105 and may convert the texts 140, 151, and 153 having lower importance into voice data.

The controller 101 may be configured to transmit the entire first web page to the external device 200 through the communication unit 105. For example, all objects included in the first web page may be transmitted to the external device 200 through the communication unit 105. The controller 101 may be configured to convert all objects, e.g., all texts, included in the first web page into voice data.

The external device 200 may, for example, be a wearable device. The external device 200 may include, for example, the display unit 203, the communication unit 205, the sensor unit 207, the audio output unit 209, and the controller 201. The sensor unit 207 of the external device 200 may collect biometric information. The external device 200 may transmit the biometric information collected from the sensor unit 207 to the electronic device 100. The external device 200 may transmit context information of the external device 200 to the electronic device 100 through the communication unit 205. The context information of the external device 200 may include information about a display size of the external device 200, a function of the external device 200, and a type of data that is processible by the external device 200. The external device 200 may have the display unit 203 that is smaller than the electronic device 100. Thus, the external device 200 may display only a portion of the first web page displayed on the display unit 103 of the electronic device 100.

For example, the context information of the external device 200 may include information indicating whether the external device 200 has a display unit, has a speaker for outputting sound, has a vibration generation unit, or has a sensor for collecting biometric information, or the like.

The display unit 203 of the external device 200 may sense a touch input. On the display unit 203 of the external device 200, the entire first web page received from the electronic device 100 or a portion thereof may be displayed. If the user touches the display unit 203 when a portion of the first web page is displayed on the display unit 203 of the external device 200, the external device 200 transmits a second signal based on user's touch input to the electronic device 100. The user's touch input may include tap, swipe, double-tap, flick, and touch & drag, or the like.

The first web page may include a first area 130 and a second area 140. The first area 130 may, for example, be a higher-layer menu of the second area 140. For example, if the first web page is a newspaper article, the first area 130 may correspond to a category name of the newspaper article. The second area 140 may correspond to a title of an article belonging to the same category.

The controller 101 may be configured to convert at least one of the first area 130 and the second area 140 into voice data based on a signal output from the sensor unit and to control the communication unit 105 to transmit the first area 130 to the external device based on context information regarding the external device 200 received through the communication unit. Transmission of the first area 130 may, for example, refer to transmission of text data or link object included in the first area 130. Conversion of the second area 140 into voice may, for example, refer to conversion of text data included in the second area 140 into voice information.

The external device 200 receives a link object and displays the received link object on the display unit 203. The controller 101 receives a signal based on a user input for selecting one of link objects displayed on the external device 200 through the communication unit 105, and may be configured to control the display unit 103 of the electronic device 100 to display a second web page corresponding to the selected link object based on the signal on the display unit 103.

The user may select a link object displayed on the external device 200 by directly touching the link object displayed on the display unit 203 or by using a voice command of the user, or the like.

The electronic device 100 converts the first area 130 into information that is processible by the external device 200 based on the received context information of the external device 200. The context information of the external device 200 may include, for example, information about a display size of the external device 200, a function of the external device 200, and a type of data that is processible by the external device 200. The external device 200 may have the display unit 203 having a smaller size than that of the display unit 103 of the electronic device 100. Thus, the external device 200 may display only a portion of the first web page displayed on the display unit 103 of the electronic device 100.

For example, the context information of the external device 200 may include, for example, information indicating whether the external device 200 has a display unit, has a speaker for outputting sound, has a vibration generation unit, or has a sensor for collecting biometric information.

The electronic device 100 may further include the location information reception unit 113 for receiving location information regarding the electronic device 100 and the electronic device may convert the first area 130 into voice data based on a signal output from the location information reception unit 113.

The electronic device 100 determines a location of the electronic device 100 using, for example, a GPS signal and a wireless AP. The controller 101 may be configured to convert at least a portion of the first web page into voice data based on location information regarding the electronic device 100. For example, if determining that the user is moving in an outdoor environment by analyzing the location information, the controller 101 may be configured to convert the first web page displayed on the display unit 103 into voice data. If determining that the user is in a theater, the controller 101 may be configured to convert the first web page displayed on the display unit 103 into voice. In the theater, surroundings are dark, and the sensor unit may sense a brightness of data the surroundings. The controller 101 may be configured to analyze a signal output from the sensor unit to determine the brightness of the surroundings, to convert the first web page displayed on the display unit 103 into voice data for output, and to turn off the display unit 103.

The controller 101 may be configured to receive a signal from the location information reception unit 113 and to determine a moving speed of the electronic device 100 based on the received signal. If the moving speed of the electronic device 100 is higher than a set value, the controller 101 may be configured to determine that the user is driving a vehicle, and to convert the first web page displayed on the display unit 103 into voice data. For example, if the moving speed of the electronic device 100 is higher than 20 km per hour, the controller 101 may be configured to determine that the user is driving the vehicle and is configured to convert the first web page into voice data.

The controller 101 may be configured to transmit the first area 130 to the external device 200 through the communication unit 105 based on security information included in the first web page.

The external device 300 may, for example, be an IVI. The IVI refers to a terminal device mounted on (or in) a vehicle to provide information. The IVI may include the display unit 303, the communication unit 305, the sensor unit 307, the audio output unit 309, and the controller 301. The display unit 303 of the IVI may be larger than the display unit 103 of the electronic device 100. The display unit 303 of the IVI may, for example, include a HUD. If the user carrying the electronic device 100 gets on or in the vehicle, the controller 101 of the electronic device 100 may be configured to receive context information of the IVI through the communication unit 105 and to attempt connection with the IVI. Once the IVI is connected, the controller 101 may be configured to convert the first web page displayed on the display unit 103 of the electronic device 100 into information that is processible by the IVI, based on the received context information of the IVI. The electronic device 100 may determine through the sensor unit 107 that the electronic device 100 is moving, and the electronic device 100 may convert the first web page displayed on the display unit 103 into voice data and transmit converted voice information of the first web page to the IVI. The IVI may output the voice information received through the communication unit 305 through the audio output unit 309. If the IVI includes the HUD, the electronic device 100 may transmit the first web page displayed on the display unit 103 to the IVI without converting the first web page into voice information. The IVI may display the received first web page on the HUD. On the HUD, the entire first web page or a portion thereof may be displayed. If the IVI includes a vibration generation unit 311, the electronic device 100 may convert the entire first web page displayed on the display unit 103 or a portion thereof into information for vibration generation and transmit the information to the IVI.

For example, if the user moves to the vehicle while browsing the web with the electronic device 100, gets on or in the vehicle, and starts driving the vehicle, then the controller 101 may be configured to recognize an environment where the electronic device 100 is used through the sensor unit 107. As the user gets on or in the vehicle, the electronic device 100 may be connected with the IVI through the communication unit 105 and may transmit the first web page displayed on the display unit 103 to the IVI through the communication unit 105.

The electronic device 100 may, for example, change a resolution of the first web page for transmission, taking a screen resolution and a screen ratio of the display unit of the IVI into account. Once the vehicle starts traveling, the electronic device 100 may convert the first web page into voice data and transmit the voice data to the IVI, and voice data corresponding to the first web page is output through a speaker of the vehicle. The electronic device 100 may transmit not only the first web page converted into voice data, but also the entire first web page or a portion thereof to the IVI. For example, voice data corresponding to the first web page may be output through the speaker of the vehicle and at the same time, brief information regarding the first web page may be displayed on the display unit of the IVI. The brief information regarding the first web page may be a portion of content included in the first web page. For example, if the first web page is a newspaper article, the brief information may be a portion of a newspaper article title. If determining that the vehicle stops or travels linearly, the electronic device 100 may control the display unit of the IVI to display the entire first web page through a voice command of the user on the display unit.

Figure 4:
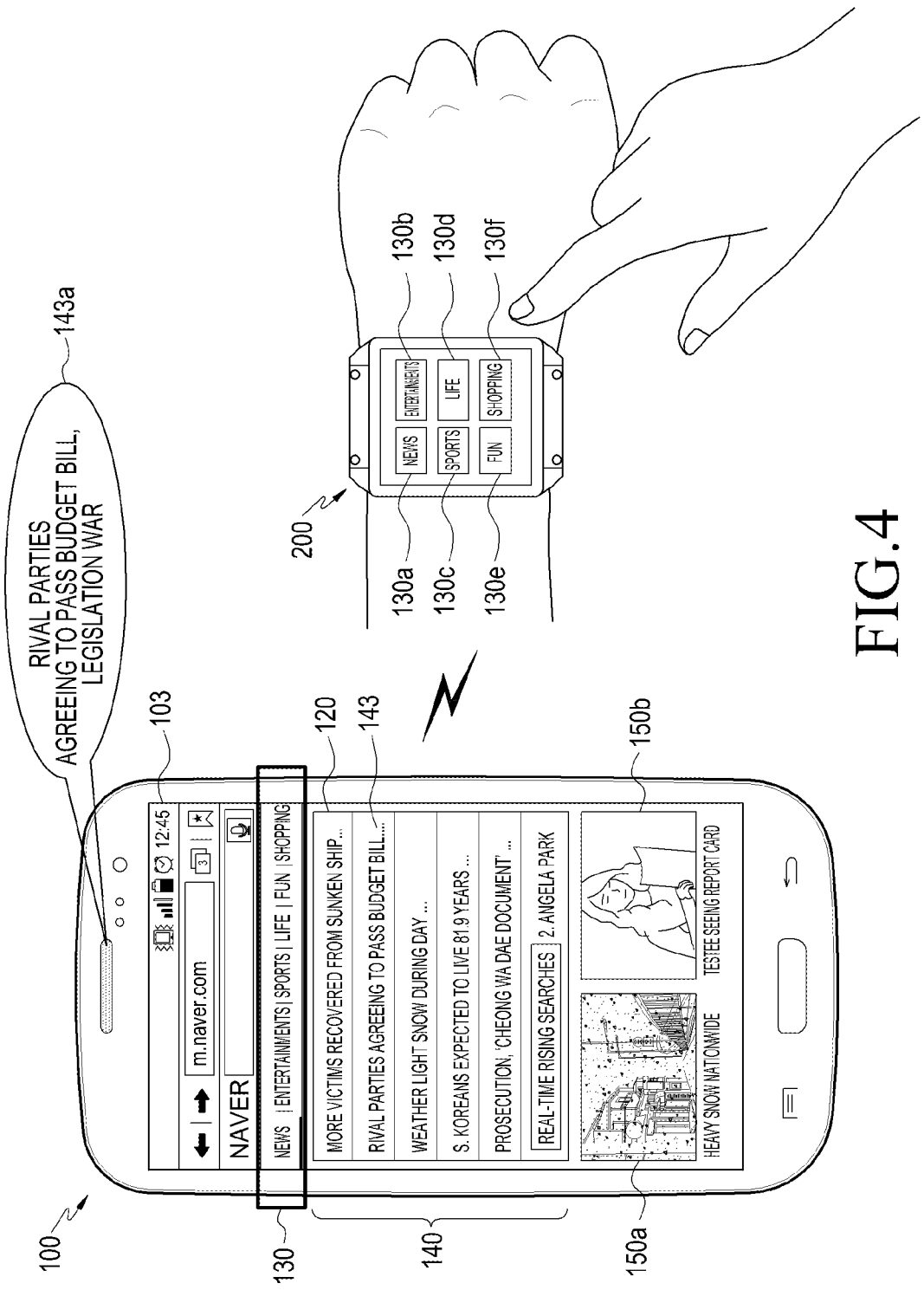
FIG. 4 illustrates an example in which a portion of a first web page displayed on an electronic device is displayed on an external device.

FIG. 4 illustrates an example in which a portion of the first web page displayed on the electronic device 100 is displayed on the external device 200. Referring to FIG. 4, the electronic device 100 and the external device 200 are illustrated. The electronic device 100 and the external device 200 may, for example, be wirelessly connected with each other. The electronic device 100 may, for example, be a smartphone, and the external device 200 may, for example, be a smart watch.

In the display unit 103 of the electronic device 100, the first web page is displayed. The first web page may include a link object and a normal object. The link object may include link information and may be a content item, such as the texts 130 and 140, the images 150*a* and 150*b*, or video, a button item, or a menu item, or the like.

The controller 101 may be configured to separate a link object and a normal object from the first web page and to extract link information from the link object. The link information may, for example, be an address of the second web page. The controller 101 may be configured to separate the link object from the first web page and to transmit the link object to the external device 200, and to convert the normal object into voice data and to output voice. The user selects the link object displayed on the external device 200 while listening to voice as content of the first web page, thus easily moving to the second web page.

The controller 101 may be configured to convert a portion of the first web page based on time into voice data and to transmit another portion of the first web page to the external device 200 based on a context of the electronic device 100. The context of the electronic device 100 may be determined by analyzing a signal output from the sensor unit 107. The controller 101 may be configured to receive the signal output from the sensor unit 107 and to determine the context of the electronic device 100 based on the received signal.

The controller 101 may be configured to convert at least a portion of the first web page into first modality information based on the signal output from the sensor unit 107. The first modality may, for example, be voice modality, and the controller 101 may be configured to convert at least a portion of the first web page into voice data based on the signal output from the sensor unit 107. The first modality may, for example, be tactile modality, and the controller 101 may be configured to convert at least a portion of the first web page into vibration information based on the signal output from the sensor unit 107.

For example, the context of the electronic device 100 may be such that the display unit 103 is covered with a cover. If determining based on the signal output from the sensor unit 107 that the display unit 103 of the electronic device 100 is covered with the cover, the controller 101 may be configured to convert the first web page into voice data.

If determining based on the signal output from the sensor unit 107 that the electronic device 100 is in a bag, the controller 101 may be configured to convert the first web page into voice data. For example, if the user puts the electronic device 100 into the bag when the first web page is displayed on the display unit 103, the signal output from the sensor unit 107 may be changed, and based on the change of the signal output from the sensor unit 107, the controller 101 may be configured to determine that the electronic device 100 is in the bag. In this case, the controller 101 may be configured to change content included in the first web page into voice information and to control the audio output unit 109 to output voice. For example, the controller 101 may be configured to convert the first web page into voice data if the signal output from the sensor unit 107 is changed when the first web page is displayed on the display unit 103.

The controller 101 may be configured to determine, based on the signal output from the sensor unit 107, whether the user gazes at the display unit 103 of the electronic device 100, and to convert the first web page into voice data.

If an earphone is connected to the electronic device 100 when the first web page is displayed on the display unit 103, the controller 101 may be configured to convert the first web page into voice data. The controller 101 may be configured to output the first web page converted into voice data in the form of a voice through the audio output unit 109.

The electronic device 100 receives context information of the external device 200 through the communication unit 105, and the controller 101 may be configured to transmit at least a portion of the first web page to the external device 200 based on the context information of the external device 200. The external device 200 may be a wearable device. The external device 200 may include the display unit 203, the audio output unit 209, and the vibration generation unit 211. The context information of the external device 200 may be information indicating a function of the external device 200 and information that is processible by the external device 200.

For example, the context information of the external device 200 may be information indicating whether the external device 200 has the display unit 203, has the audio output unit 209, or has the vibration generation unit 211.

Upon receiving the context information of the external device 200 through the communication unit 105, the controller 101 may be configured to determine a function of the external device 200 based on a received signal. Once determining the function of the external device 200, the controller 101 may be configured to determine a way for the external device 200 to process the first web page displayed on the display unit 103 of the electronic device 100 and to convert the first web page in the determined way to process the first web page.

For example, if the external device 200 has the display unit 203, the controller 101 may be configured to determine a resolution of the display unit 203 of the external device 200 from the context information of the external device 200 received through the communication unit 105, and to transmit at least a portion of the first web page to the external device 200 based on the resolution. For instance, if the first web page includes the first area 130, the controller 101 may be configured to transmit the first area 130 to the external device 200.

The first web page may include a link object, and the controller 101 may be configured to transmit at least some of link objects included in the first web page to the external device 200. The link object may include, for example, a text including link information.

The at least a portion of the first web page transmitted to the external device 200 may be determined based on importance information of texts included in the first web page, and the electronic device 100 transmits the text 130 having high importance in the first web page displayed on the display unit 103 to the external device 200.

The external device 200 displays texts 130a, 130b, 130c, 130d, 130e, and 130f having, for example, high importance in the first web page received from the electronic device 100 on the display unit 203 of the external device 200. The texts 130a, 130b, 130c, 130d, 130e, and 130f having high importance may, for example, be link objects including link information.

If the resolution of the display unit 203 of the external device 200 is equal to or greater than that of the display unit 103 of the electronic device 100, the electronic device 100 may transmit the entire first web page to the external device 200.

If the external device 200 has an audio output unit, the controller 101 may be configured to convert the entire first web page or a portion thereof into voice and to transmit the converted voice information of the first web page to the external device 200. The external device 200 may output the voice information regarding the first web page received from the electronic device 100 through the audio output unit. If the external device 200 has a vibration output unit, the controller 101 may be configured to convert at least a portion of the first web page into information for generating vibration. The external device 200 may generate vibration by using vibration information regarding the first web page received from the electronic device 100.

The electronic device 100 may further include a location information reception unit 113 that receives location information regarding the electronic device 100, and converts at least a portion of the first web page into first modality information based on a signal output from the location information reception unit 113. The first modality may be different from visual modality. For example, the first modality may be voice modality. The first modality may, for example, be tactile modality.

The electronic device 100 may determine a location of the electronic device 100 using, for example, a GPS signal and a wireless AP. The controller 101 may be configured to convert at least a portion of the first web page into voice data based on location information regarding the electronic device 100. For example, if it is determined that the user is moving in an outdoor environment by analyzing location information, the controller 101 may be configured to convert the first web page displayed on the display unit 103 into voice data. If it is determined, for example, that the user is in a theater, the controller 101 may be configured to convert the first web page displayed on the display unit 103 into voice data. In the theater, surroundings are dark, and the sensor unit may sense a brightness of the surroundings. The controller 101 may be configured to analyze a signal output from the sensor unit to determine the brightness of the surroundings, to convert the first web page displayed on the display unit 103 into voice data for output, and to turn off the display unit 103.

The controller 101 may be configured to receive a signal from the location information reception unit 113 and to determine a moving speed of the electronic device 100 based on the received signal. If the moving speed of the electronic device 100 is higher than a set value, the controller 101 may be configured to determine that the user is driving a vehicle, and to convert the first web page displayed on the display unit 103 into voice data. For example, if the moving speed of the electronic device 100 is higher than 20 km per hour, the controller 101 may be configured to determine that the user is driving the vehicle and to convert the first web page into voice data.

If the first web page displayed on the display unit 103 of the electronic device 100 includes security information, the controller 101 may be configured to output at least a portion of the first web page to the external device 200 through the communication unit 105 based on the security information included in the first web page. If the first web page needs to be secured like financial information and personal information, a security level of the first web page may be high. If the security level of the first web page displayed on the display unit 103 is high, the controller 101 may be configured to not transmit the first web page to the external device 200. If the security level of the first web page displayed on the display unit 103 is low or the first web page has no security information, the controller 101 may be configured to output at least a portion of the first web page to the external device 200.

If the first web page displayed on the display unit 103 of the electronic device 100 needs continuous browsing, the electronic device 100 may transmit at least a portion of the first web page to the external device 200 based on attributes of the first web page and a context of the electronic device 100. For example, if the first web page includes map information and the electronic device 100 is determined to move, the controller 101 may be configured to transmit the first web page to the connectable external device 200. In this case, the first web page may be changed into information that is processible by the external device 200.

The electronic device 100 may transmit at least a portion of the first web page to the external device 200 based on first web page information that is set by the user. The controller 101 may be configured to display, on the display unit 103, a user interface (UI) screen for allowing the user to select a web page that needs web browsing transition to the external device 200 during user's web browsing, enable the user to set the web page needing web browsing transition on the UI screen, or the like.

The controller 101 may be configured to refer to web page information set by the user and to transmit a portion of the first web page to the external device 200 based on user-set information. The controller 101 may be configured to refer to the web page information set by the user and to convert the portion of the first web page into voice data based on the user-set information. For example, if the user selects a map site, a navigation information providing site, a stock site, and an e-mail site, and set them as sites needing web browsing transition, the controller 101 may be configured to transmit a portion of the first web page to the external device 200 based on web page setting information. The controller 101 may be configured to convert the portion of the first web page into voice data.

If the first web page includes a map, the controller 101 may be configured to determine that the first web page needs web browsing transition by referring to the web page setting information, and to transmit the portion of the first web page to the external device 200. The controller 101 may be configured to convert the portion of the first web page into voice data. The controller 101 may also be configured to transmit the portion of the first web page to the external device 200 and to convert another portion of the first web page into voice data.

If the first web page includes stock information, the controller 101 may be configured to determine that the first web page needs web browsing transition by referring to the web page setting information, and to transmit the portion of the first web page to the external device 200. The controller 101 may also be configured to convert the portion of the first web page into voice data. The controller 101 may be configured to transmit the portion of the first web page to the external device 200 and to convert another portion of the first web page into voice data.

If the first web page includes a newspaper article, the controller 101 may be configured to determine that the first web page does not need web browsing transition by referring to the web page setting information, and to not transmit the first web page to the external device. The controller 101 may be configured to not convert the first web page into voice data.

If there are a plurality of external devices, the controller 101 may be configured to determine an external device to which web browsing is to transit based on the user-set information. The controller 101 may be configured to display a list of external devices to which web browsing is to transit on the display unit 103, and transits web browsing to an external device corresponding to user-selected external device setting information.

For example, if there are a smart watch and a tablet as external devices and the user sets the smart watch as an external device to which web browsing is to transit, then the controller 101 may be configured to transit web browsing to the smart watch.

If the user sets the smart watch as an external device to which web browsing is to transit for a web page "A" and sets the tablet as an external device to which web browsing is to transit for a web page "B", the controller 101 may be configured to perform web browsing transition to the smart watch for the web page "A" and to perform web browsing transition to the tablet for the web page "B".

The controller 101 may be configured to convert at least a portion of the first web page into voice databased on context information of the electronic device 100 and the user-set information. The controller 101 may be configured to transmit the at least a portion of the first web page to the smart watch based on the context information of the electronic device 100 and the user-set information.

If the first web page includes a first area and a second area, the controller 101 may be configured to convert at least one of the first area and the second area into voice data based on a signal output from the sensor unit, and to transmit the first area to the smart watch based on the user-set information.

The controller 101 may be configured to determine the context of the electronic device 100 and to perform web browsing transition based on the context of the electronic device 100. The controller 101 may be configured to determine the context of the electronic device 100 by analyzing the signal output from the sensor unit. The controller 101 may be configured to determine, based on the signal output from the sensor unit, whether the electronic device 100 moves, a brightness of surroundings of the electronic device 100, whether the electronic device 100 is connected with an earphone, and whether the electronic device is connected with a vehicle, or the like. For example, the controller 101 may be configured to convert at least a portion of the first web page displayed on the display unit 103 into voice data based on the context of the electronic device 100.

For example, the controller 101 may be configured to receive a signal output from the acceleration sensor included in the sensor unit and to determine whether the electronic device 100 moves based on the signal. Once determining that the electronic device 100 is moving, the controller 101 may be configured to convert the first web page displayed on the display unit 103 into voice data.

The controller 101 may be configured to receive a signal output from the illumination sensor included in the sensor unit and to determine a brightness of the surroundings of the electronic device 100 based on the signal. If the surroundings are dark, the controller 101 may be configured to determine that the electronic device 100 is covered with a cover or is in a bag. If determining that the electronic device 100 is covered with the cover or is in the bag, the controller 101 may be configured to convert the first web page displayed on the display unit 103 into voice data.

The controller 101 may be configured to convert the first web page displayed on the display unit 103 into voice data if the earphone is connected to the electronic device 100.

The electronic device 100 receives context information of the external device 200 from the external device 200 and transmits texts included in the first web page to the external device 200 through the communication unit 105. The texts may be link objects including link information.

The external device 200 may receive at least some of texts included in the first web page from the electronic device 100 and display the received texts on the external device 200. The texts displayed on the external device 200 may be link objects including link information.

For example, the text 130 displayed on the display unit 103 of the electronic device 100 is transmitted to the external device 200, together with link information, through the communication unit 105. On the external device 200, texts 130a, 130b, 130c, 130d, 130e, and 130f including link information are displayed on the external device 200. If the user selects one of the texts 130a, 130b, 130c, 130d, 130e, and 130f displayed on the external device 200, the external device 200 transmits a signal based on the selected text to the electronic device 100. The electronic device 100 receives a signal based on a user input for selecting one of the texts displayed on the external device 200 and controls the display unit 103 of the electronic device 100 to display a second web page corresponding to the selected text on the display unit 103. For example, the controller 101 may be configured to control the display unit 103 to display the second web page based on link information of the selected text.

For example, if the texts 130a, 130b, 130c, 130d, 130e, and 130f are displayed on the external device 200 and the user selects the text 130f from among the texts 130a, 130b, 130c, 130d, 130e, and 130f, then the external device 200 transmits a signal corresponding to the selected text 130f to the electronic device 100. The texts 130a, 130b, 130c, 130d, 130e, and 130f displayed on the external device 200 may include, for example, link information. The electronic device 100 receives the signal corresponding to the selected text 130f. The controller 101 may be configured to control the display unit 103 to display the second web page corresponding to the received text 130f on the display unit 103.

Figure 5:
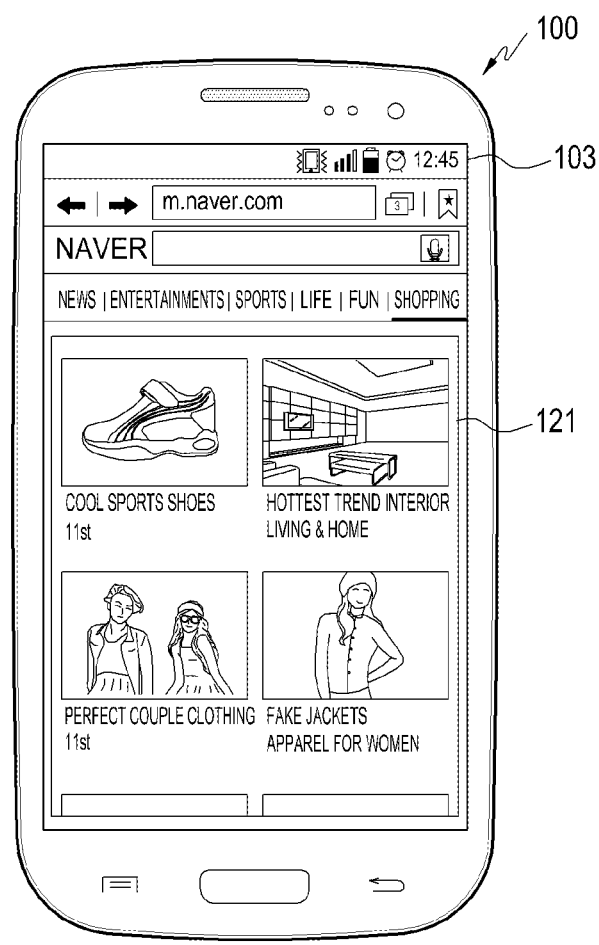
FIG. 5 illustrates an example in which a portion of a second web page displayed on a display of an electronic device is displayed on an external device.

FIG. 5 illustrates an example in which a second web page is displayed on the display unit 103 of the electronic device 100. Referring to FIG. 5, a second web page 121 is displayed on the display unit 103. When the first web page is displayed on the display unit 103 of FIG. 4, if the electronic device 100 receives a signal based on a user input for selecting one of texts displayed on the external device 200 through the communication unit 105, the controller 101 may be configured to control the display unit 103 to display the second web page 121 corresponding to the text selected based on the received signal on the display unit 103. The texts displayed on the external device 200 may be replaced with graphic objects. If the electronic device 100 receives a signal based on a user input for selecting one of graphic objects displayed on the external device 200 through the communication unit 105 when the first web page is displayed on the display unit 103 of FIG. 4, the controller 101 may be configured to control the display unit 103 to display the second web page 121 corresponding to the graphic object selected based on the received signal on the display unit 103.

Figure 6:
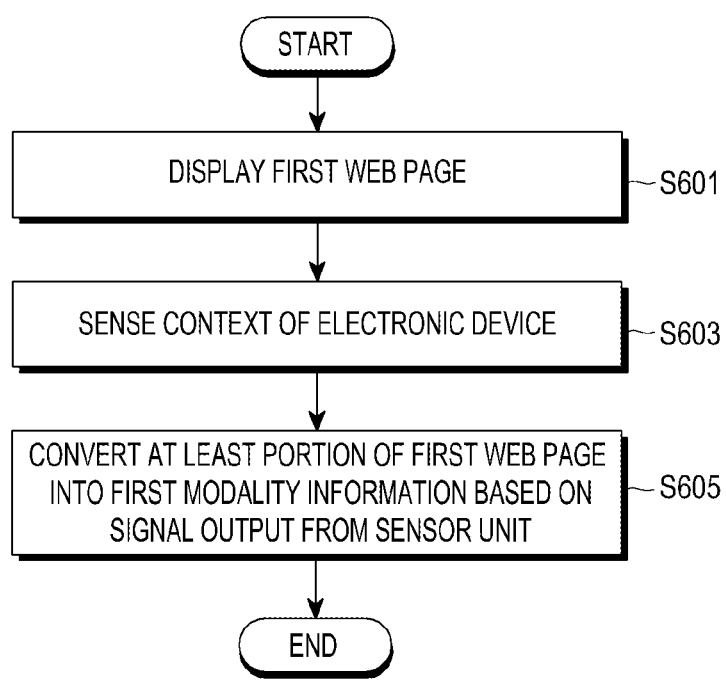
FIG. 6 is a flowchart illustrating an example process of converting a first web page into first modality information based on a context of an electronic device.

FIG. 6 is a flowchart illustrating an example process for converting the first web page into first modality information according to a context of the electronic device 100. With reference to FIGS. 2, 4, and 6, a description will be made of a process of converting the first web page into the first modality information according to a context of the electronic device 100.

Referring to FIG. 6, the electronic device 100 displays the first web page on the display unit 103 in operation 5601. The first web page may include link objects and normal objects. The link objects may be a text including link information and a graphic object.

The controller 101 may be configured to parse the first web page to divide the first web page into link objects and normal objects. The link objects include, for example, link information. The normal objects have no link information. The link information may, for example, be an address of the second web page. The controller 101 may be configured to assign priorities to the link objects. Each of the link objects may include importance information, and the controller 101 may be configured to assign a priority to each link object based on the importance information and to re-sort the link objects. The importance information may be included in the first web page.

The electronic device 100 senses a context of the electronic device 100 through the sensor unit 107 in operation 5603. The sensor unit 107 senses a context of the electronic device 100 and a context of the surroundings of the electronic device 100. The sensor unit 107 may include, for example, at least one sensor for detecting the context of the electronic device 100. For example, the sensor unit 107 may include a proximity sensor for detecting whether the user approaches the electronic device 100, an illumination sensor for detecting the amount of light around the electronic device 100, and a gyro sensor for detecting a direction by using a rotational inertia of the electronic device 100, or the like. The sensor unit 107 may include an acceleration sensor (not shown) that detects an acceleration applied to three axes (e.g., an X axis, a Y axis, and a Z axis) of the electronic device 100, a gravity sensor that detects a direction in which gravity is applied, or an altimeter that detects an altitude by measuring a pressure of the air.

The sensor unit 107 may detect a motional acceleration and a gravitational acceleration of the electronic device 100. In case of the electronic device 100 being fixed, the sensor unit 107 may detect only the gravity acceleration. For example, if a front surface of the electronic device 100 is directed upward, the gravity acceleration has a positive (+) direction; if a rear surface of the electronic device 100 is directed upward, the gravity acceleration has a negative (−) direction. The sensor unit 107 may further include a fingerprint sensor (not shown) that detects a user's fingerprint, an UV sensor (not shown) that detects surrounding UV rays, or a heartbeat sensor (not shown) that detects a user's heartbeat, or the like.

The sensor included in the sensor unit 107 may detect the context of the electronic device 100 and transmit an electric signal corresponding to the detection to the controller 101. In an example of the disclosure, the controller 101 may be configured to determine the context of the electronic device 100 based on a signal output from the sensor unit 107. For example, the controller 101 may be configured to determine whether the display unit 103 of the electronic device 100 is covered with a cover using an output of the illumination sensor. The controller 101 may be configured to determine whether the electronic device 100 is in user's bag by using an output of the illumination sensor. The controller 101 may be configured to determine whether the electronic device 100 is moving using an output of the acceleration sensor.

The electronic device 100 converts at least a portion of the first web page into first modality information based on a signal output from the sensor unit 107 in operation 5605. The first modality may, for example, be voice modality. For example, the electronic device 100 may convert link objects and normal objects included in the first web page into voice data based on the signal output from the sensor unit 107.

The electronic device 100 may include the communication unit 105. The communication unit 105 communicates with the external device 200. The communication unit 105 receives a first signal from the external device 200. The first signal may include context information of the external device 200. The controller 101 may be configured to convert at least a portion of the first web page into voice data based on the signal output from the sensor unit 107 and to control the communication unit 105 to transmit the at least a portion of the first web page to the external device 200 based on context information regarding the external device 200 received through the communication unit 105.

The controller 101 may be configured to convert the first web page into information that is processible by the external device 200 based on the context information regarding the external device 200. For example, the controller 101 may be configured to convert the first web page into voice information and transmit the voice information to the external device 200, if it is determined that the external device 200 has an audio output unit without a display unit.

The controller 101 may be configured to analyze the context information regarding the external device 200 received through the communication unit 105 to determine that the external device 200 is a smart watch and has a display unit with a resolution lower than that of the display unit 103 of the electronic device 100. For example, the controller 101 may be configured to convert a link object 120 of the first web page displayed on the display unit 103 into voice information and transmit a link object (e.g., the first area 130) to the external device 200.

The communication unit 105 receives a second signal from the external device 200. The second signal may be a signal output from the external device 200 in response to generation of an input in the external device 200. For example, the second signal may be generated when the user touches a link object displayed on the external device 200. The link object may be a text. The link object may be a graphic object. The link object may be some of the link objects included in the first web page. If the user selects one link object when at least some of the link objects included in the first web page are displayed on the external device 200, the external device 200 may transmit the second signal to the electronic device 100 based on the user's selection.

For example, upon receiving the user input, the external device 200 outputs the second signal to the electronic device 100. The second signal may be based on a user input for selecting one of link information included in the first web page in the external device 200. The controller 101 may be configured to receive the second signal based on a user input for selecting one of link objects displayed on the external device 200 through the communication unit 105 and to control the display unit 103 to display a second web page corresponding to the link object selected based on the second signal on the display unit 103.

The electronic device 100 may include the location information reception unit 113 for receiving location information. The location information reception unit 113 may include, for example, a GPS receiver. The GPS receiver periodically receives a signal (e.g., orbit information of a GPS satellite, time information of a satellite, and a navigation message) from a plurality of GPS satellites on the orbit of Earth. In an outdoor environment, the electronic device 100 determines locations of the plurality of GPS satellites and a location of the electronic device 100 by using signals received from the plurality of GPS satellites, and determines a distance by using a transmission/reception time difference. The electronic device 100 may determine a location, a time, or a moving speed of the electronic device 100 through triangulation. For orbit correction or time correction, an additional GPS satellite may be needed.

In an indoor environment, the electronic device 100 may detect a location or moving speed of the electronic device 100 using a wireless AP (not shown). In the indoor environment, location detection of the electronic device 100 may use a cell-ID scheme using an ID of a wireless AP, an enhanced cell-ID scheme using an ID and an RSS of the wireless AP, or an AoA scheme using an angle at which a signal transmitted from the AP is received by the electronic device 100. The electronic device 100 may detect a location or moving speed of the electronic device 100 located in an indoor environment using a wireless beacon (not shown). It would be easily understood by those of ordinary skill in the art that an indoor position of the electronic device 100 may be detected using various schemes as well as the aforementioned schemes.

In an example of the disclosure, the controller 101 may be configured to determine an outdoor location using the location information reception unit 113 or an indoor location using a wireless AP. The controller 101 may be configured to convert at least a portion of the first web page displayed on the display unit 103 into first modality information based on a signal output from the location information reception unit 113. For example, if the electronic device 100 is situated in a theater, the controller 101 may be configured to convert the first web page displayed on the display unit 103 into voice data.

If the first web page includes security information, the controller 101 may be configured to transmit at least a portion of the first web page to the external device 200 through the communication unit 105 based on security information included in the first web page. For example, if the first web page corresponds to a financial transaction site, the first web page may include security information and the controller 101 may be configured to not transmit the first web page to the external device 200. If the first web page includes user information, the controller 101 may be configured to transmit a portion of the first web page to the external device 200 based on the security information. In this case, data transmitted to the external device 200 may be data that does not include the security information or may have a low security level among data of the first web page.

Figure 7:
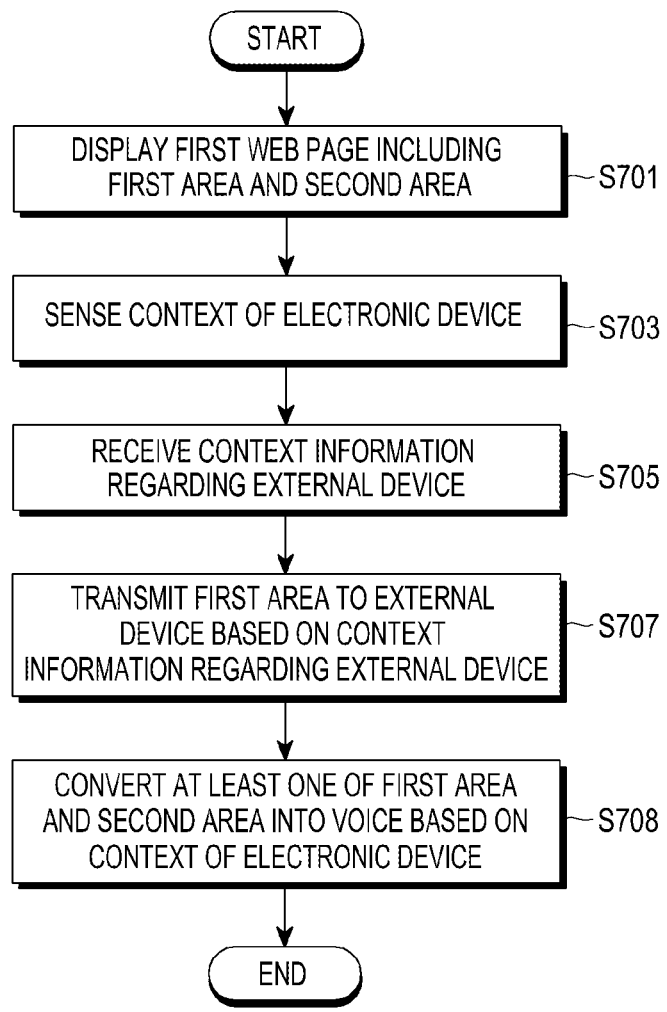
FIG. 7 is a flowchart illustrating an example process of transmitting a first area of a first web page to an external device based on context information of an electronic device.

FIG. 7 is a flowchart illustrating an example process for transmitting a first area of a first web page to an external device based on context information of an electronic device. Hereinafter, with reference to FIGS. 2, 3, and 7, a description will be made of the process of transmitting the first area of the first web page to the external device based on the context information of the electronic device.

Referring to FIG. 7, the electronic device 100 displays the first web page including the first area 130 and the second area 140 on the display unit 103 in operation S701. The first area 130 may, for example, be a higher-level menu of the second area 140. The web page may include link objects and normal objects. The link objects may be a text including link information and a graphic object.

The electronic device 100 senses a context of the electronic device 100 through the sensor unit 107 in operation 5703. The sensor unit 107 senses a context of the electronic device 100 and a context of the surroundings of the electronic device 100.

The electronic device 100 receives context information regarding the external device 200 in operation 5705. The electronic device 100 may include a communication unit 105. The communication unit 105 may communicate with the external device 200.

The controller 101 may be configured to transmit the first area 130 to the external device 200 based on the received context information regarding the external device 200 in operation 5707. The context information regarding the external device 200 may include, for example, information about a resolution and a size of the display unit of the external device 200. The context information regarding the external device 200 may also include, for example, information about a function of the external device 200.

The context information regarding the external device 200 may include, for example, information about a display size of the external device 200, a function of the external device 200, and a type of data that is processible by the external device 200. The external device 200 may have the display unit 203 that is smaller than the electronic device 100. Thus, the external device 200 may display only a portion of the first web page displayed on the display unit 103 of the electronic device 100.

For example, the context information regarding the external device 200 may include information indicating whether the external device 200 has a display unit, has a speaker for outputting sound, has a vibration generation unit, or has a sensor for collecting biometric information, or the like.

The electronic device 100 converts at least one of the first area 130 and the second area 140 into voice data based on the context of the electronic device 100 in operation 5708. The controller 101 may be configured to determine the context of the electronic device 100 based on a signal output from the sensor unit 107.

The sensor unit 107 may include, for example, at least one sensor that detects the context of the electronic device 100. For example, the sensor unit 107 may include a proximity sensor that detects whether the user approaches the electronic device 100, an illumination sensor that detects the amount of light around the electronic device 100, and a gyro sensor that detects a direction by using rotational inertia of the electronic device 100, or the like. The sensor unit 107 may include an acceleration sensor (not shown) that detects an acceleration applied to three axes (e.g., an X axis, a Y axis, and a Z axis) of the electronic device 100, a gravity sensor that detects a direction in which gravity is applied, or an altimeter that detects an altitude by measuring a pressure of the air.

The sensor included in the sensor unit 107 may detect the context of the electronic device 100 and transmit an electric signal corresponding to the detection to the controller 101. In an example of the disclosure, the controller 101 may be configured to determine the context of the electronic device 100 based on a signal output from the sensor unit 107. For example, the controller 101 may be configured to determine whether the display unit 103 of the electronic device 100 is covered with a cover by using an output of the illumination sensor. The controller 101 may be configured to determine whether the electronic device 100 is in user's bag using an output of the illumination sensor. The controller 101 may be configured to determine whether the electronic device 100 is moving using an output of the acceleration sensor.

If determining that the display unit 103 is covered with the cover or the electronic device 100 is in the bag when the first web page is displayed on the display unit 103, the controller 101 may be configured to convert the second area 140 into voice data. That is, the controller may be configured to convert a text included in the second area 140 into voice information and to output voice data through the audio output unit 109. For example, the controller 101 may be configured to transmit the first area 130 to the external device 200 based on context information regarding the external device 200. For example, the controller 101 may be configured to transmit a text included in the first area 130 to the external device 200.

If determining that the display unit 103 is covered with the cover or the electronic device 100 is in user's bag when the first web page is displayed on the display unit 103, the controller 101 may be configured to convert the first area 130 and the second area 140 into voice data. For example, the controller 101 may be configured to convert texts included in the first area 130 and the second area 140 into voice information and outputs voice through the audio output unit 109. The controller 101 may be configured to transmit the first area 130 to the external device 200 based on the context information regarding the external device 200.

Figure 8:
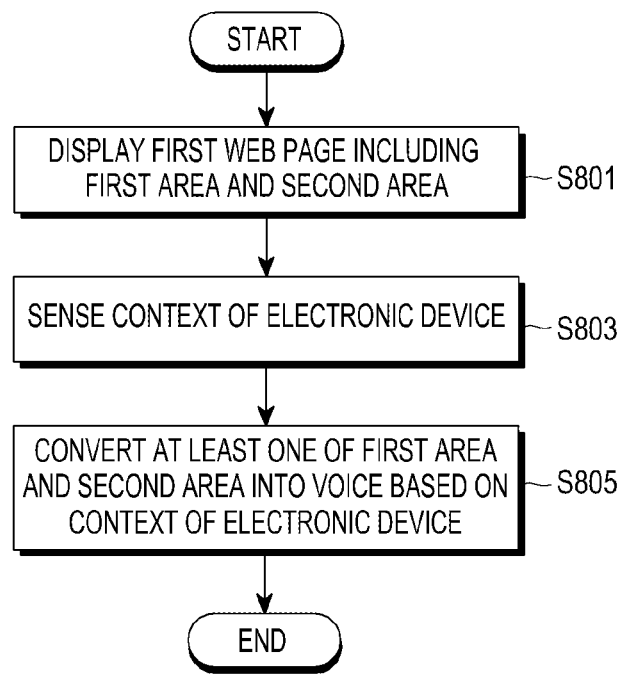
FIG. 8 is a flowchart illustrating an example process of converting at least one of a first area and a second area included in a first web page into voice data based on context information of an electronic device.

FIG. 8 is a flowchart illustrating an example process of transmitting a first area of a first web page to an external device based on context information of an electronic device. A description will be made of the process of transmitting the first area of the first web page to the external device based on the context information of the electronic device with reference to FIGS. 2, 3, and 8.

Referring to FIG. 8, the electronic device displays the first web page including the first area 130 and the second area 140 on the display unit 103 in operation 5801. The first area 130 may be a higher-level menu of the second area 140. The web page may include link objects and normal objects. The link objects may be a text including link information and a graphic object.

The electronic device senses a context of the electronic device 100 through the sensor unit 107 in operation 5803. The sensor unit 107 senses a context of the electronic device 100 and a context of the surroundings of the electronic device 100.

The electronic device converts at least one of the first area 130 and the second area 140 into voice data based on the context of the electronic device in operation 5805. The controller 101 may be configured to determine the context of the electronic device 100 based on a signal output from the sensor unit 107.

The sensor unit 107 may include, for example, at least one sensor that detects the context of the electronic device 100. For example, the sensor unit 107 may include a proximity sensor that detects whether the user approaches the electronic device 100, an illumination sensor that detects the amount of light around the electronic device 100, and a gyro sensor that detects a direction by using rotational inertia of the electronic device 100, or the like. The sensor unit 107 may include an acceleration sensor (not shown) that detects an acceleration applied to three axes (e.g., an X axis, a Y axis, and a Z axis) of the electronic device 100, a gravity sensor that detects a direction in which gravity is applied, or an altimeter that detects an altitude by measuring a pressure of the air.

The sensor included in the sensor unit 107 detects the context of the electronic device 100 and transmits an electric signal corresponding to the detection to the controller 101. In an example of the disclosure, the controller 101 may be configured to determine the context of the electronic device 100 based on the signal output from the sensor unit 107. For example, the controller 101 may be configured to determine whether the display unit 103 is covered with a cover by using an output of the illumination sensor. The controller 101 may be configured to determine whether the electronic device 100 is in user's bag using an output of the illumination sensor. The controller 101 may be configured to determine whether the electronic device 100 is moving using an output of the acceleration sensor.

If it is determined that the display unit 103 of the electronic device 100 is covered with the cover or the electronic device 100 is in user's bag when the first web page is displayed on the display unit 103, the controller 101 may be configured to convert the second area 140 into voice data. For example, the controller 101 may be configured to convert texts included in the second area 140 into voice information and outputs the texts in the form of voice through the audio output unit 109.

If it is determined that the display unit 103 of the electronic device 100 is covered with the cover or the electronic device 100 is in user's bag when the first web page is displayed on the display unit 103, the controller 101 may be configured to convert the first area 130 and the second area 140 into voice data. For example, the controller 101 may be configured to convert texts included in the first area 130 and the second area 140 into voice information and to output the texts in the form of voice through the audio output unit 109.

As is apparent from the foregoing description, according to various examples of the disclosure, the electronic device and the method for representing a web content for the electronic device may sense a context of the electronic device through the sensor unit to recognize a user's intention, and may be configured to automatically convert a time information-based web page displayed on the display unit into modality information such as voice or vibration, thereby providing continuous web information to the user and thus offering a convenient experience to the user.

Moreover, web information is provided through voice and at the same time, a link object may be displayed on the external electronic device and another web page may be selected through the link object, making user's experience convenient.

The electronic device according to various examples of the disclosure may include, for example, a processor, a memory for storing program data and executing the program data, a permanent storage such as a disk drive, a communications port for handling communications with external devices, and user interface devices, including a touch panel, keys, buttons, and the like. Methods implemented with software modules or algorithms may be stored as program instructions or computer-readable codes executable on the processor on a computer-readable media such as read-only memory (ROM), random-access memory (RAM), compact disk (CD)-ROMs, magnetic tapes, floppy disks, and optical data storage devices. The computer-readable recording medium can also be distributed over network-coupled computer systems so that the computer readable code is stored and executed in a distributed fashion. The media can be read by the computer, stored in the memory, and executed by the processor.

The examples of the disclosure may be described in terms of functional block components and various processing steps. Such functional blocks may be realized by any number of hardware (e.g., circuitry) and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosure may employ any number of conventional techniques for electronics configuration, signal processing and/or control, data processing and the like. The words "mechanism", "element", "means", and "configuration" are used broadly and are not limited to mechanical or physical examples, but may include software routines in conjunction with processors, other hardware (e.g., circuitry) or the like.

The example implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

The use of the terms "a" and "an" and "the" and similar referents in the context of describing the disclosure (especially in the context of the following claims) may be construed to cover both the singular and the plural. Furthermore, recitation of ranges of values herein are merely intended to serve as a shorthand method of referring individually to each separate value falling within the range (unless otherwise indicated herein), and each separate value is incorporated into the specification as if it were individually recited herein. The steps of all example methods described herein are performable in any suitable order unless otherwise indicated herein or otherwise clearly indicated by context. The use of any and all examples or exemplary language (e.g., "or the like") provided herein, is intended merely to better illuminate the disclosure and does not pose a limitation on the scope of the disclosure unless otherwise claimed. Moreover, it is well understood by one of ordinary skill in the art that numerous modifications, adaptations, and changes may be made under design conditions and factors without departing from the spirit and scope of the disclosure as defined by the following claims and within the range of equivalents thereof.

What is claimed is:

1. An electronic device comprising:
   a speaker;
   a display;
   a sensor;
   communication circuitry; and
   a controller configured to:
      display, on the display, a first web page comprising a first area and a second area, the first area including a plurality of objects linked to a plurality of web pages, respectively,
      determine, via the sensor, a state of the electronic device,
      output, via the speaker, at least one voice corresponding to at least one text included in at least one of the first area and the second area, when it is determined that a user does not stare at the first web page according to the state of the electronic device, and
      determine whether to convert the at least one text included in the at least one of the first area and the second area of the first web page to voice data based on a capability of a wearable external device received from the wearable external device, and
      transmit, via the communication circuitry, a first information to output information included in the first area to the wearable external device, based on the capability of the wearable external device when it is determined that the user does not stare at the first web page according to the state of the electronic device.

2. The electronic device of claim 1, wherein the controller is configured to display a second web page linked to an object included in the first area displayed on the wearable external device, in response to receiving a signal corresponding to an input selecting the object displayed on the wearable external device.

3. The electronic device of claim 1, wherein the controller is configured to convert information related to the first area into the first information that the wearable external device is able to output, based on the capability of the wearable external device.

4. The electronic device of claim 1, further comprising:
   a location information receiver configured to receive location information regarding the electronic device,
   wherein the controller is configured to convert the at least one text included in the first area into the at least one voice based on the location information.

5. The electronic device of claim 1, wherein the controller is configured to transmit the first information to the external device based on security information included in the first web page.

6. The electronic device of claim 1, wherein the sensor comprises at least one of: an optical sensor, an acceleration sensor, and a gravity sensor.

7. The electronic device of claim 1, wherein the controller is configured to transmit the first information to display at least one object among the plurality of objects on the wearable external device, to the wearable external device, based on a priority of each of the plurality of objects.

8. A method for operating an electronic device, the method comprising:
   displaying, on a display of the electronic device, a first web page comprising a first area and a second area, the first area including a plurality of objects linked to a plurality of web pages, respectively;
   determining, via a sensor, a state of the electronic device,
   outputting at least one voice corresponding to at least one text included in at least one of the first area and the second area based on a state of the electronic device, when it is determined that a user does not stare at the first web page according to the state of the electronic device; and
   determining whether to convert the at least one text included in at least one of the first area and the second area of the first web page to voice data based on a capability of a wearable external device received from the wearable external device, and
   transmitting a first information to output information included in the first area, to the wearable external device, based on the capability of the wearable external device, when it is determined that the user does not stare at the first web page according to the state of the electronic device.

9. The method of claim 8, further comprising:
   displaying a second web page linked to an object included in the first area displayed on the wearable external device, in response to receiving a signal corresponding to an input selecting the object displayed on the wearable external device.

10. The method of claim 8, further comprising:
    converting information related to the first area into the first information that the wearable external device is able to output, based on the capability of the wearable external device.

11. The method of claim 8, further comprising:
receiving location information regarding the electronic device; and
converting the at least text included in the first area into the at least one voice based on the received location information.

12. The method of claim 8, further comprising:
transmitting the first information to the wearable external device based on security information included in the first web page.

13. The method of claim 8, wherein the sensor comprises at least one of: an optical sensor, an acceleration sensor, and a gravity sensor.

14. The method of claim 8, wherein transmitting the first information includes transmitting the first information to display at least one object among the plurality of objects on the wearable external device, to the wearable external device, based on a priority of each of the plurality of objects.

* * * * *